United States Patent
Zhu et al.

(10) Patent No.: US 10,091,504 B2
(45) Date of Patent: Oct. 2, 2018

(54) VARIATIONS OF RHO-DOMAIN RATE CONTROL

(71) Applicant: Microsoft Technology Licensing, LLC, Redmond, WA (US)

(72) Inventors: Lihua Zhu, Mountain View, CA (US); Shir Aharon, Mountain View, CA (US); B. Anil Kumar, Saratoga, CA (US); Sridhar Sankuratri, Campbell, CA (US); Jeroen E. van Eesteren, Palo Alto, CA (US); Costin Hagiu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 14/592,789

(22) Filed: Jan. 8, 2015

(65) Prior Publication Data
US 2016/0205404 A1 Jul. 14, 2016

(51) Int. Cl.
*H04N 19/115* (2014.01)
*H04N 19/146* (2014.01)
(Continued)

(52) U.S. Cl.
CPC ......... *H04N 19/115* (2014.11); *H04N 19/124* (2014.11); *H04N 19/146* (2014.11);
(Continued)

(58) Field of Classification Search
CPC .................................................. H04N 19/196
See application file for complete search history.

(56) References Cited

U.S. PATENT DOCUMENTS

| 7,606,427 B2 | 10/2009 | Malayath et al. |
| 8,009,730 B2 | 8/2011 | Zhu et al. |

(Continued)

FOREIGN PATENT DOCUMENTS

CN 100581262 1/2010

OTHER PUBLICATIONS

Zhihai He; S.K. Mitra, rho/-domain bit allocation and rate control for real time video coding, Oct. 7-10, 2001, Proceedings 2001 International Conference on Image Processing.*
(Continued)

*Primary Examiner* — Jamie Atala
*Assistant Examiner* — Hesham Abouzahra
(74) *Attorney, Agent, or Firm* — Klarquist Sparkman, LLP

(57) ABSTRACT

Variations of rho-domain rate control for video encoding or other media encoding are presented. For example, in some of the variations, an encoder sets a rho value for a unit of media based at least in part on a bit allocation for the unit. The encoder also computes transform coefficients for the unit using a frequency transform having multiple location-dependent scale factors, sets a value of quantization parameter ("QP") for the unit using a mapping of QP values to rho values, and uses the value of QP for the unit during quantization of the transform coefficients of the unit. When the QP-rho mapping is determined, a location-independent scale factor that approximates the multiple location-dependent scale factors is used and/or certain scaling operations are integrated, which reduces computational complexity while still supporting accurate rate control decisions. Implementations of such variations of rate control can exploit opportunities for caching and parallel computation.

20 Claims, 11 Drawing Sheets software 180 implementing one or more innovations for variations of rho-domain rate control

(51) Int. Cl.

| | |
|---|---|
| H04N 19/147 | (2014.01) |
| H04N 19/196 | (2014.01) |
| H04N 19/149 | (2014.01) |
| H04N 19/60 | (2014.01) |
| H04N 19/124 | (2014.01) |
| H04N 19/18 | (2014.01) |
| H04N 19/192 | (2014.01) |
| H04N 19/176 | (2014.01) |
| H04N 19/70 | (2014.01) |
| H04N 19/172 | (2014.01) |
| H04N 19/15 | (2014.01) |
| H04N 19/126 | (2014.01) |
| H04N 19/132 | (2014.01) |
| H04N 19/14 | (2014.01) |
| H04N 19/152 | (2014.01) |
| H04N 19/157 | (2014.01) |
| H04N 19/177 | (2014.01) |
| H04N 19/174 | (2014.01) |

(52) U.S. Cl.
CPC ......... *H04N 19/147* (2014.11); *H04N 19/149* (2014.11); *H04N 19/18* (2014.11); *H04N 19/192* (2014.11); *H04N 19/196* (2014.11); *H04N 19/60* (2014.11); *H04N 19/126* (2014.11); *H04N 19/132* (2014.11); *H04N 19/14* (2014.11); *H04N 19/15* (2014.11); *H04N 19/152* (2014.11); *H04N 19/157* (2014.11); *H04N 19/172* (2014.11); *H04N 19/174* (2014.11); *H04N 19/176* (2014.11); *H04N 19/177* (2014.11); *H04N 19/70* (2014.11)

(56) References Cited

U.S. PATENT DOCUMENTS

| | | | |
|---|---|---|---|
| 8,126,283 | B1* | 2/2012 | Garbacea ............ G06F 17/3079 375/240 |
| 8,179,981 | B2 | 5/2012 | Chen et al. |
| 8,340,172 | B2 | 12/2012 | Panda |
| 8,406,309 | B2 | 3/2013 | Lee et al. |
| 2007/0009027 | A1 | 1/2007 | Zhu et al. |
| 2011/0123128 | A1 | 5/2011 | Huang et al. |
| 2012/0057629 | A1 | 3/2012 | Shi et al. |
| 2017/0134743 | A1* | 5/2017 | Sim ...................... H04N 19/503 |

OTHER PUBLICATIONS

He et al., "ρ-Domain Bit Allocation and Rate Control for Real Time Video Coding," *IEEE Int'l Conf. on Image Processing*, vol. 3, pp. 546-549 (Oct. 2001).

International Search Report and Written Opinion dated Apr. 13, 2016, from International Patent Application No. PCT/US2016/012249, 16 pp.

Patchoo et al., "Gaussian-Mixture Modeling of Lattice-Based Spherical Vector Quantization Performance in Transform Audio Coding," *IEEE Int'l Conf. on Acoustics, Speech and Signal Processing*, pp. 373-376 (Mar. 2010).

Sullivan et al., "Overview of the High Efficiency Video Coding (HECV) Standard," *IEEE Trans. on Circuits and Systems for Video Technology*, vol. 22, No. 12, pp. 1649-1668 (Dec. 2012).

Biatek et al., "Efficient Quantization Parameter Estimation in HEVC based on ρ-Domain," *Proc. of 22$^{nd}$ European Signal Processing Conf.*, 5 pp. (Sep. 2014).

He, "A Unified Approach to Rate-Distortion Analysis and Rate Control for Visual Coding and Communication" *PhD Dissertation*. University of California, Santa Barbara, 160 pp. (Jun. 2001).

He et al., "Low-Delay Rate Control for DCT Video Coding via ρ-Domain Source Modeling," *IEEE Trans. on Circuits and Systems for Video Technology*, vol. 11, No. 8, pp. 928-940 (Aug. 2001).

He et al., "Optimum Bit Allocation and Accurate Rate Control for Video Coding via ρ-Domain Source Modeling," *IEEE Trans. on Circuits and Systems for Video Technology*, vol. 12, No. 10, pp. 840-849 (Oct. 2002).

He et al., "ρ-Domain Optimum Bit Allocation and Accurate Rate Control for DCT Video Coding," *Visual Communications and Image Processing*, vol. 4671, pp. 734-745 (Jan. 2002).

He et al., "ρ-Domain Source Modeling and Rate Control for Video Coding and Transmission," *Proc. IEEE Int'l Conf. on Acoustics, Speech, and Signal Processing*, vol. 3, 4 pp. (May 2001).

Li et al., "Adaptive Rate Control with HRD Consideration," *JVT-H014*, 8th meeting, Geneva, 19 pp. (May 2003).

Li et al., "Adaptive Rate Control for H.264," *ICIP*, pp. 745-748 (Oct. 2004).

Microsoft Corporation, "MMX, SSE, and SSE2 Intrinsics," 2 pp. (downloaded from the World Wide Web on Jan. 8, 2015).

Milani et al., "An Accurate Low-Complexity Rate Control Algorithm Based on ($\rho$, $E_q$)-Domain," *IEEE Trans. on Circuits and Systems for Video Technology*, vol. 18, No. 2, pp. 257-262 (Feb. 2008).

Pitrey et al., "One-Pass Bitrate Control for MPEG-4 Scalable Video Coding Using ρ-Domain," *IEEE Int'l Symp. on Broadband Multimedia Systems and Broadcasting*, 5 pp. (May 2009).

Pitrey et al., "Rho-Domain Based Rate Control Scheme for Spatial, Temporal and Quality Scalable Video Coding," *Proc. Visual Communications and Image Processing*, vol. 7257, 9 pp. (Jan. 2009).

Pitrey et al., "Rho-Domain for Low-Complexity Rate Control on MPEG-4 Scalable Video Coding," *IEEE Int'l Symp. on Multimedia*, 9 pp. (Dec. 2008).

Valenzise et al., "A ρ-Domain Rate Controller for Multiplexed Video Sequences," *Proc. of Picture Coding Symp.*, 4 pp. (Nov. 2007).

Wikipedia, "Single-Precision Floating-Point Format," 7 pp. (downloaded from the World Wide Web on Jan. 8, 2015).

Winnyefanho.net, "Fast Logarithm Converter for Fixed-point Numbers without Look-up Table," 4 pp. (undated).

Xiaoping et al., "A Rate-Distortion Rate Control Algorithm Based ρ-Domain for Video Coding," *Proc. Int'l Conf. on Wireless Communications, Networking and Mobile Computing*, 4 pp. (Jun. 2011).

Xu et al., "A New Rate Control Algorithm for H.264," *IEEE Int'l Conf. on Integration Technology*, pp. 574-578 (Mar. 2007).

International Preliminary Report on Patentability dated Sep. 20, 2016, from International Patent Application No. PCT/US2016/012249, 16 pp.

* cited by examiner software 180 implementing one or more innovations
for variations of rho-domain rate control

400 rho values at different bit allocations (in kbps) for different pictures rho values at different QP values (from 1 to 51) for a given picture

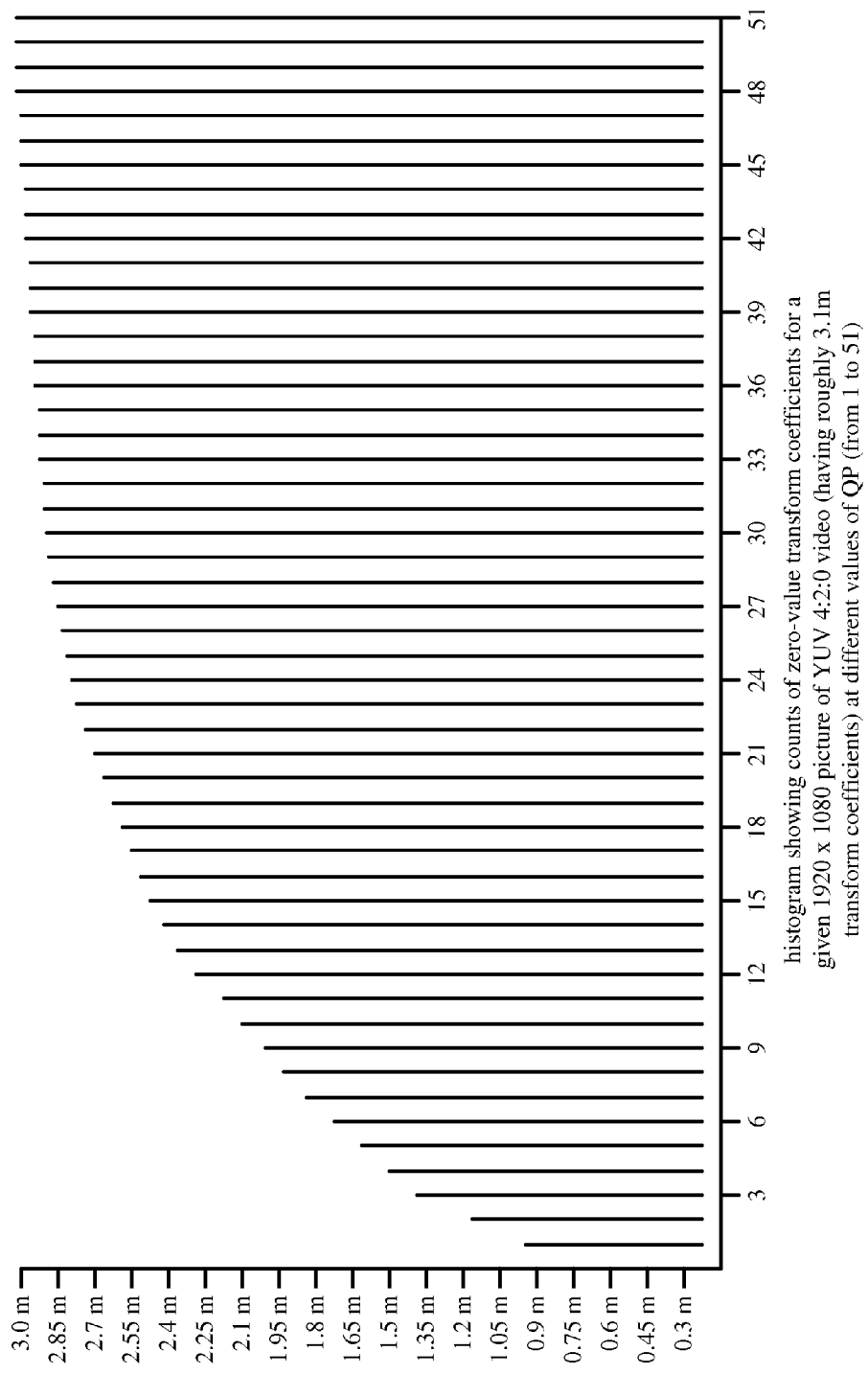

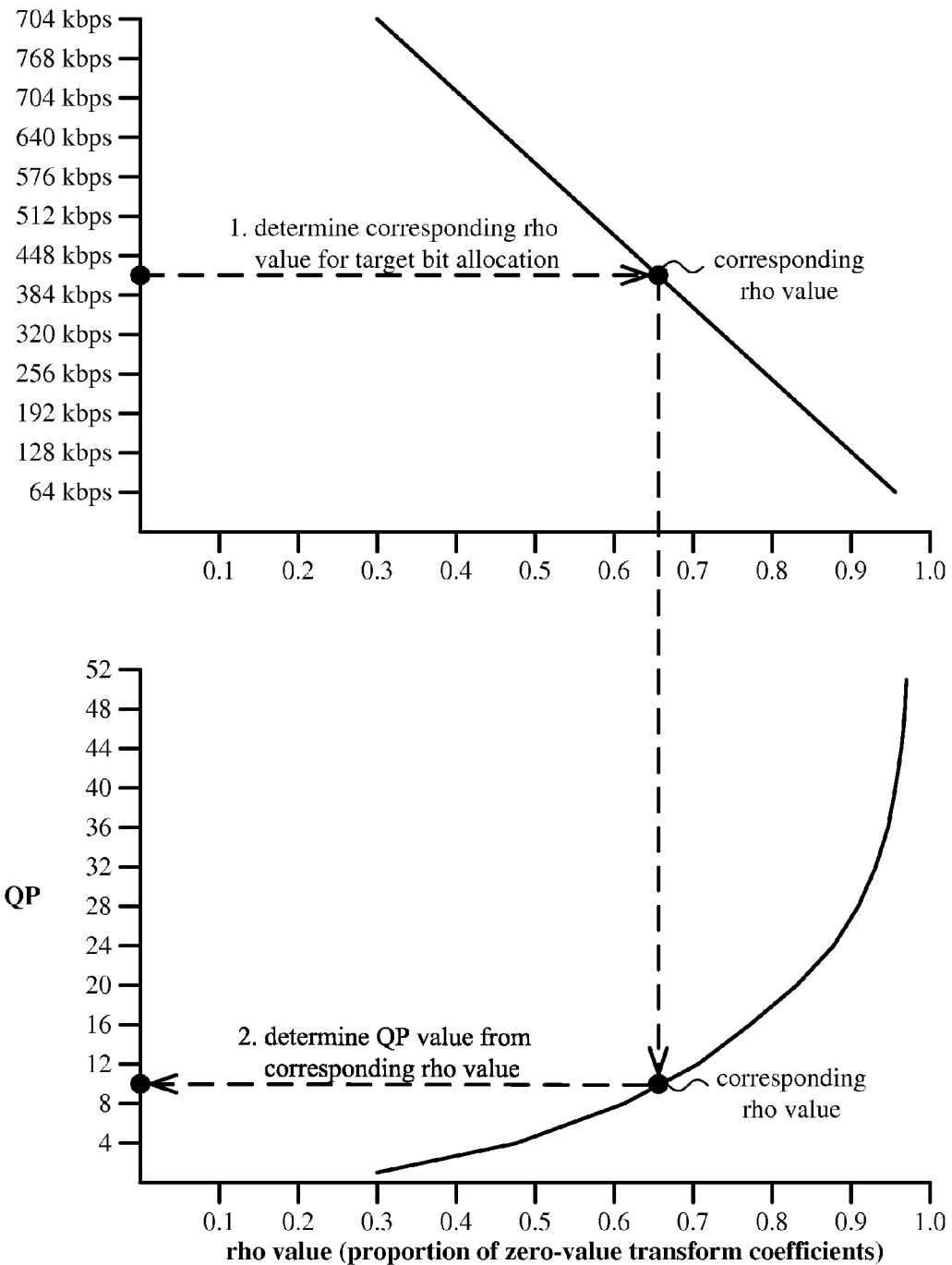

FIG. 9a  900

```
float c = (float)x;
int *const pf = (int *)(&c);
int n = *pf;
const int e = ((n>>23) & 255) - 127;
n &= 0x007FFFFF;
n += 0x3F800000;
*pf = n;
float r = *((float *)pf);
v = (-1.0/3.0*r + 2.0) * r - 5.0/3.0 + e;
```

FIG. 9b  910

```
float c = (float)x*sf;
int *const pf = (int *)(&c);
int n = *pf;
const int e = ((n>>23) & 255) - 127;
n &= 0x007FFFFF;
n += 0x3F800000;
*pf = n;
float Qm = *((float *)pf);
QP = (-2.0f * Qm + 12.0f) * Qm - 4.0 + 6.0f * e;
```

FIG. 10          1000

```
static inline Void Coeff2QPSSE(__m128i &e, __m128i &m, Float minQP, Float maxQP)
{
    m = _mm_unpacklo_epi16(e, _mm_cmplt_epi16(e, _mm_setzero_si128()));     ⎫
    e = _mm_unpackhi_epi16(e, _mm_cmplt_epi16(e, _mm_setzero_si128()));     ⎬ 1001

__m128 k = _mm_cvtepi32_ps(m);     ⎫
    __m128 l = _mm_cvtepi32_ps(e);     ⎬ 1002 k = _mm_mul_ps(k, _mm_set1_ps(0.1581f));     ⎫
    l = _mm_mul_ps(l, _mm_set1_ps(0.1581f));     ⎬ 1003 m = _mm_castps_si128(k);

e = _mm_srli_epi32(m, 23);
    e = _mm_and_si128(e, _mm_set1_epi32(0xFF));
    e = _mm_sub_epi32(e, _mm_set1_epi32(0x80));
    m = _mm_and_si128(m, _mm_set1_epi32(0x007FFFFF));
    m = _mm_add_epi32(m, _mm_set1_epi32(0x3F800000));

k = _mm_castsi128_ps(m);
    m = _mm_castps_si128(l);                                                  ⎬ 1004 l = _mm_mul_ps(_mm_set1_ps(-2.0f), k);
    l = _mm_add_ps(l, _mm_set1_ps(12.0f));
    l = _mm_mul_ps(k, l);
    k = _mm_cvtepi32_ps(e);
    k = _mm_mul_ps(k, _mm_set1_ps(6.0f));
    k = _mm_add_ps(k, _mm_set1_ps(1.5f));
    l = _mm_add_ps(l, k);

l = _mm_min_ps(l, _mm_set1_ps(maxQP));     ⎫
    l = _mm_max_ps(l, _mm_set1_ps(minQP));     ⎬ 1005 e = _mm_srli_epi32(m, 23);
    e = _mm_and_si128(e, _mm_set1_epi32(0xFF));
    e = _mm_sub_epi32(e, _mm_set1_epi32(0x80));
    m = _mm_and_si128(m, _mm_set1_epi32(0x007FFFFF));
    m = _mm_add_epi32(m, _mm_set1_epi32(0x3F800000));

k = _mm_castsi128_ps(m);
    m = _mm_cvtps_epi32(l);
                                                                              ⎬ 1006
    l = _mm_mul_ps(_mm_set1_ps(-2.0f), k);
    l = _mm_add_ps(l, _mm_set1_ps(12.0f));
    l = _mm_mul_ps(k, l);
    k = _mm_cvtepi32_ps(e);
    k = _mm_mul_ps(k, _mm_set1_ps(6.0f));
    k = _mm_add_ps(k, _mm_set1_ps(1.5f));
    l = _mm_add_ps(l, k);

l = _mm_min_ps(l, _mm_set1_ps(maxQP));     ⎫
    l = _mm_max_ps(l, _mm_set1_ps(minQP));     ⎬ 1007 e = _mm_cvtps_epi32(l);     — 1008
}
```

FIG. 13a 1300
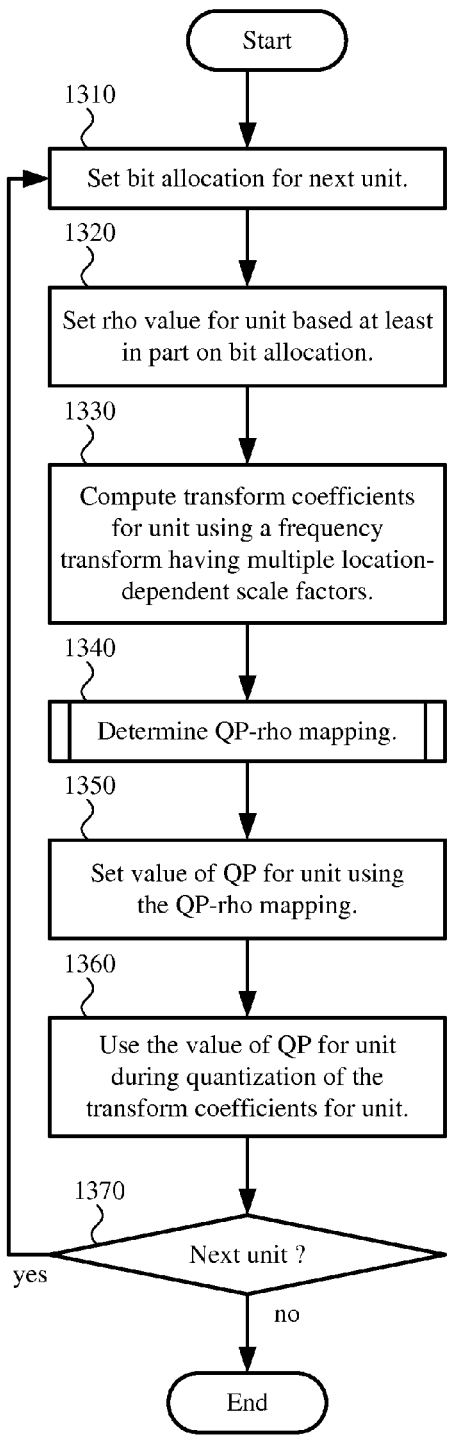
FIG. 13b 1301 (example of 1340)
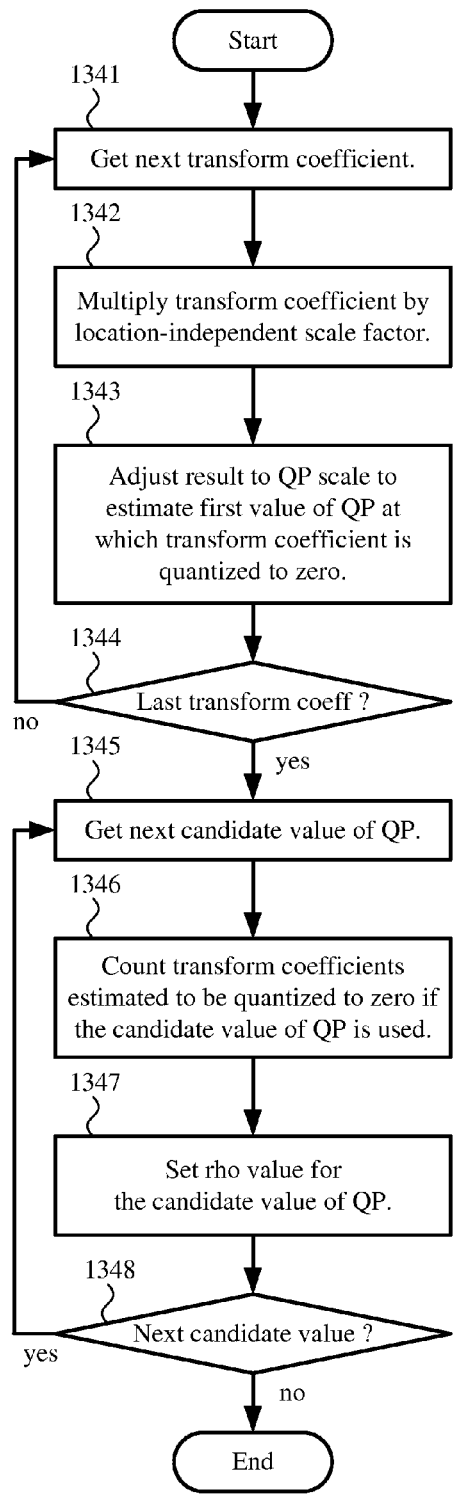

VARIATIONS OF RHO-DOMAIN RATE CONTROL

BACKGROUND

Engineers use compression (also called source coding or source encoding) to reduce the bit rate of digital video. Compression decreases the cost of storing and transmitting video information by converting the information into a lower bit rate form. Compression can be lossless, in which case quality of the video when reconstructed does not suffer but decreases in bit rate are limited by the complexity of the video. Or, compression can be lossy, in which case quality of the reconstructed video suffers but decreases in bit rate are more dramatic. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the ITU-T H.265 standard (H.265, HEVC, or ISO/IEC 23008-2) has been approved. Various extensions to the H.265 standard are under development. A video codec standard typically defines options for the syntax of an encoded video bitstream, detailing parameters in the bitstream when particular features are used in encoding and decoding. In many cases, a video codec standard also provides details about decoding operations a decoder should perform to achieve conforming results in decoding. Aside from codec standards, various proprietary codec formats define other options for the syntax of an encoded video bitstream and corresponding decoding operations.

In general, for lossy compression, a video encoder trades off bit rate against distortion introduced during the compression process. Distortion is introduced to simplify video content, thereby enabling more dramatic reductions in bit rate. The encoder can use more bits to compress video content while introducing less distortion, so that the reconstructed version of the video has higher quality. Or, the encoder can use fewer bits to compress the video content while introducing more distortion, so that the reconstructed version of the video has lower quality. In practice, the number of bits available to compress video is usually limited by network bandwidth or storage considerations. Thus, the goal of the encoder becomes providing the best overall quality for reconstructed video, subject to bit rate limits (and possibly other constraints such as delay constraints). For example, the encoder can allocate more bits to complex regions of video (which are less compressible, and hence need more bits to attain a given quality level) and allocate fewer bits to simpler regions (which need fewer bits to attain the given quality level). In many video delivery scenarios, a video encoder attempts to provide video at a constant bit rate ("CBR"). For CBR encoding, the encoder typically uses an output buffer to produce encoded data at a constant, target bit rate. In addition to providing feedback to the encoder to control quality and bit rate, the output buffer provides limited room to "smooth out" fluctuations above/below the target bit rate, where such fluctuations are due to changes in the intrinsic complexity of the video. On the other hand, for variable bit rate ("VBR") encoding, the encoder attempts to provide reconstructed video with constant or relatively constant quality, even if bit rate varies significantly. For example, the encoder uses a smoothly variable quantization parameter ("QP") for different types of frames, such that quality is uniform or almost uniform, but output bit rate may vary depending on the content of the video.

An encoder uses "rate control" to manage bit rate and quality during encoding. For most standards and formats, the encoder sets a QP for a picture or portion of a picture. The value of QP affects bit rate and quality. As the encoder increases the value of QP, bit rate decreases but the quality of the reconstructed video also tends to decrease. As the encoder decreases the value of QP, bit rate increases and the quality of the reconstructed video also tends to increase. Many previous approaches to rate control fall short of optimal quality for a given bit rate, fail to consistently produce encoded video at a target bit rate, or fail to adapt quickly to scene changes in video. This is especially common when a video encoder adapted to encode camera video instead encodes screen capture content, e.g., for remote desktop conferencing. Other previous approaches to rate control, such as previous approaches to so-called rho-domain rate control, regulate quality and bit rate more effectively but are too computationally intensive to use in many scenarios.

SUMMARY

In summary, the detailed description presents innovations in rate control for video encoding or other media encoding. Some of the innovations relate to variations of rho-domain rate control that have significantly reduced computational complexity compared to prior rho-domain rate control approaches, but still support accurate rate control decisions. Such innovations facilitate efficient implementations of rate control that exploit opportunities for caching and parallel computation.

According to a first aspect of the innovations presented herein, a media encoder (e.g., a video encoder, image encoder, or audio encoder) performs a method of rate control. The encoder encodes a current unit of media to produce encoded data and outputs the encoded data. The current unit is, for example, a picture of video. As part of the encoding, the encoder sets a rho value for the current unit based at least in part on a bit allocation for the current unit. The rho value indicates, for example, a target proportion of zero-value quantized transform coefficients for the current unit. As part of the encoding, the encoder also computes transform coefficients for the current unit using a frequency transform having multiple location-dependent scale factors, sets a value of QP for the current unit using a QP-rho mapping, and uses the value of QP for the current unit during quantization of the transform coefficients for the current unit. The QP-rho mapping is a mapping between candidate values of QP and corresponding rho values for those candidate values of QP, respectively. The QP-rho mapping is determined with a location-independent scale factor that approximates the multiple location-dependent scale factors, which reduces the computational complexity of the rate control.

According to a second aspect of the innovations presented herein, a media encoder (e.g., a video encoder, image encoder, or audio encoder) performs a method of rate control. The encoder encodes a current unit of media to produce encoded data and outputs the encoded data. As part of the encoding, the encoder sets a rho value for the current unit based at least in part on a bit allocation for the current unit. The rho value indicates, for example, a target proportion of zero-value quantized transform coefficients for the current unit. The encoder determines a QP-rho mapping between candidate values of QP and corresponding rho values for the candidate values of QP, respectively. As part of the encoding, the encoder also computes transform coefficients for the current unit using a frequency transform, sets a value of QP for the current unit using the QP-rho mapping, and uses the value of QP for the current unit during quantization of the transform coefficients for the current unit. When it determines the QP-rho mapping, the encoder integrates at least some scaling operations to scale the respective transform coefficients for the current unit.

According to a third aspect of the innovations presented herein, a computer system is configured to implement a media encoder (e.g., a video encoder, image encoder, or audio encoder). The media encoder includes a frequency transformer, a quantizer, and a rate controller. The frequency transformer is configured to compute transform coefficients for a current unit of media using multiple location-dependent scale factors. The quantizer is configured to quantize the transform coefficients for the current unit using a value of QP for the current unit. The rate controller is configured to set a rho value for the current unit based at least in part on a bit allocation for the current unit. The rho value indicates, for example, a target proportion of zero-value quantized transform coefficients for the current unit. The rate controller is also configured to set the value of QP for the current unit using a QP-rho mapping, which is a mapping between candidate values of QP and corresponding rho values for those candidate values of QP, respectively. The QP-rho mapping can be determined with a location-independent scale factor that approximates the multiple location-dependent scale factors, which reduces the computational complexity of rate control. Also, when the QP-rho mapping is determined, at least some scaling operations can be integrated to scale the respective transform coefficients for the current unit.

The innovations for rate control decisions can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIG. 6 is a chart illustrating a histogram of counts of zero-value transform coefficients at different candidate values of QP.

FIG. 8 is a chart illustrating an example of the relationship between a target bit allocation value, corresponding rho value, and QP value.

FIGS. 9a and 9b are code listings illustrating an approach to determining the lowest QP value at which a transform coefficient is quantized to zero.

FIG. 10 is a code listing illustrating another approach to determining the lowest QP value at which a transform coefficient is quantized to zero.

FIGS. 13a and 13b are flowcharts illustrating an example technique for a combined implementation for a variation of rho-domain rate control.

DETAILED DESCRIPTION

Figure 1:
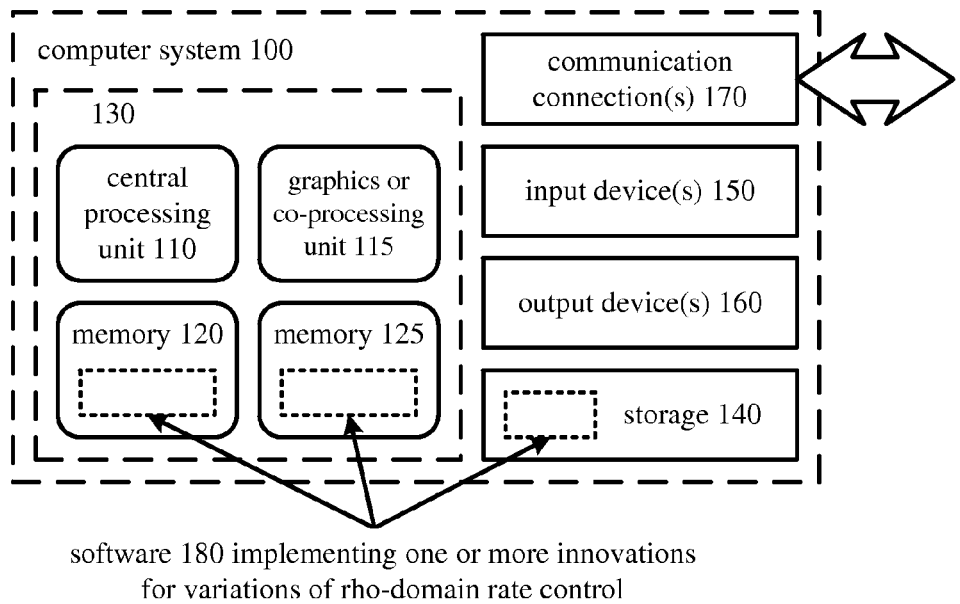
FIG. 1 is a diagram of an example computer system in which some described embodiments can be implemented.

The detailed description presents innovations in rate control for video encoding or other media encoding. For example, some of the innovations relate to variations of rho-domain rate control in which computational complexity is reduced, compared to prior rho-domain rate control approaches, by using a location-independent scale factor that approximates multiple location-dependent scale factors. Other innovations relate to variations of rho-domain rate control in which computational complexity is reduced, compared to prior rho-domain rate control approaches, by integrating certain scaling operations when generating a mapping of quantization parameter ("QP") values to rho values. Variations of rho-domain rate control presented herein can be implemented efficiently using various combinations of special-purpose hardware and software, including an application-specific integrated circuit ("ASIC"), a graphics processing unit ("GPU"), or a central processing unit ("CPU") executing single-instruction, multiple-data ("SIMD") instructions for efficient caching and parallel processing.

Although operations presented herein are in places described as being performed by a video encoder, in many cases the operations can be performed by another type of media encoder (e.g., image encoder, audio encoder). In particular, the variations of rho-domain rate control can be implemented in any media encoder that uses a frequency transform and quantizes the resulting transform coefficients.

Some of the innovations presented herein are illustrated with reference to syntax elements and operations specific to the H.264 standard or H.265 standard. The innovations presented herein can also be implemented for other standards or formats.

Many of the innovations presented herein can improve rate-distortion performance when encoding certain "artificially" created video content such as screen-capture content for remote desktop conferencing or another use case scenario. Screen-capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video. Many of the innovations presented herein can also be used for natural video.

More generally, various alternatives to the examples presented herein are possible. For example, some of the methods presented herein can be altered by changing the ordering of the method acts described, by splitting, repeating, or omitting certain method acts, etc. The various aspects of the disclosed technology can be used in combination or separately. Different embodiments use one or more of the described innovations. Some of the innovations presented herein address one or more of the problems noted in the background. Typically, a given technique/tool does not solve all such problems.

I. Example Computer Systems

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose CPU, processor in an ASIC or any other type of processor. In a multi-processing system, multiple processing units execute computer-executable instructions to increase processing power. For example, FIG. 1 shows a CPU (110) as well as a GPU or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for variations of rho-domain rate control, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic disks, magnetic tapes or cassettes, optical storage media such as CD-ROMs or DVDs, or any other medium which can be used to store information and which can be accessed within the computer system (100). The storage (140) stores instructions for the software (180) implementing one or more innovations for variations of rho-domain rate control.

The input device(s) (150) may be a touch input device such as a keyboard, mouse, pen, or trackball, a voice input device, a scanning device, or another device that provides input to the computer system (100). For video, the input device(s) (150) may be a camera, video card, TV tuner card, screen capture module, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

For the sake of presentation, the detailed description uses terms like "determine," "set," and "use" to describe computer operations in a computer system. These terms are high-level abstractions for operations performed by a computer, and should not be confused with acts performed by a human being. The actual computer operations corresponding to these terms vary depending on implementation.

II. Example Network Environments

Figure 2A:
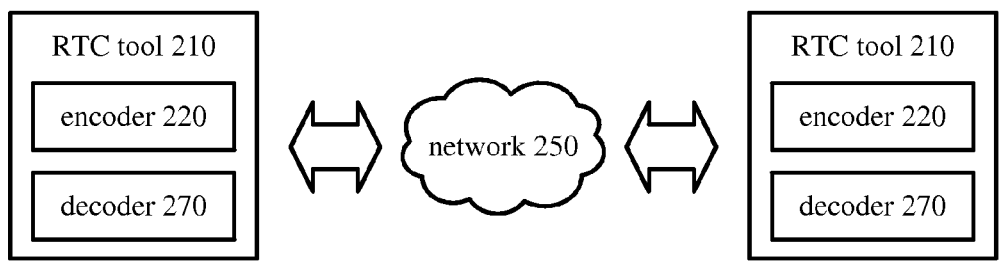
FIGS. 2a and 2b are diagrams of example network environments in which some described embodiments can be implemented.
Figure 2B:
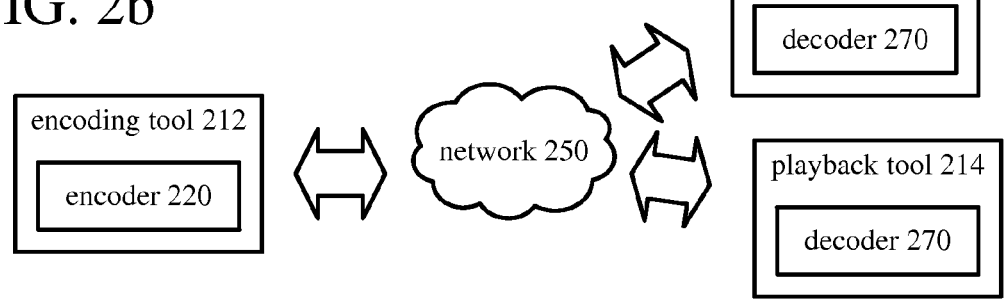

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265 standard, SMPTE 421M standard, H.264 standard, another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
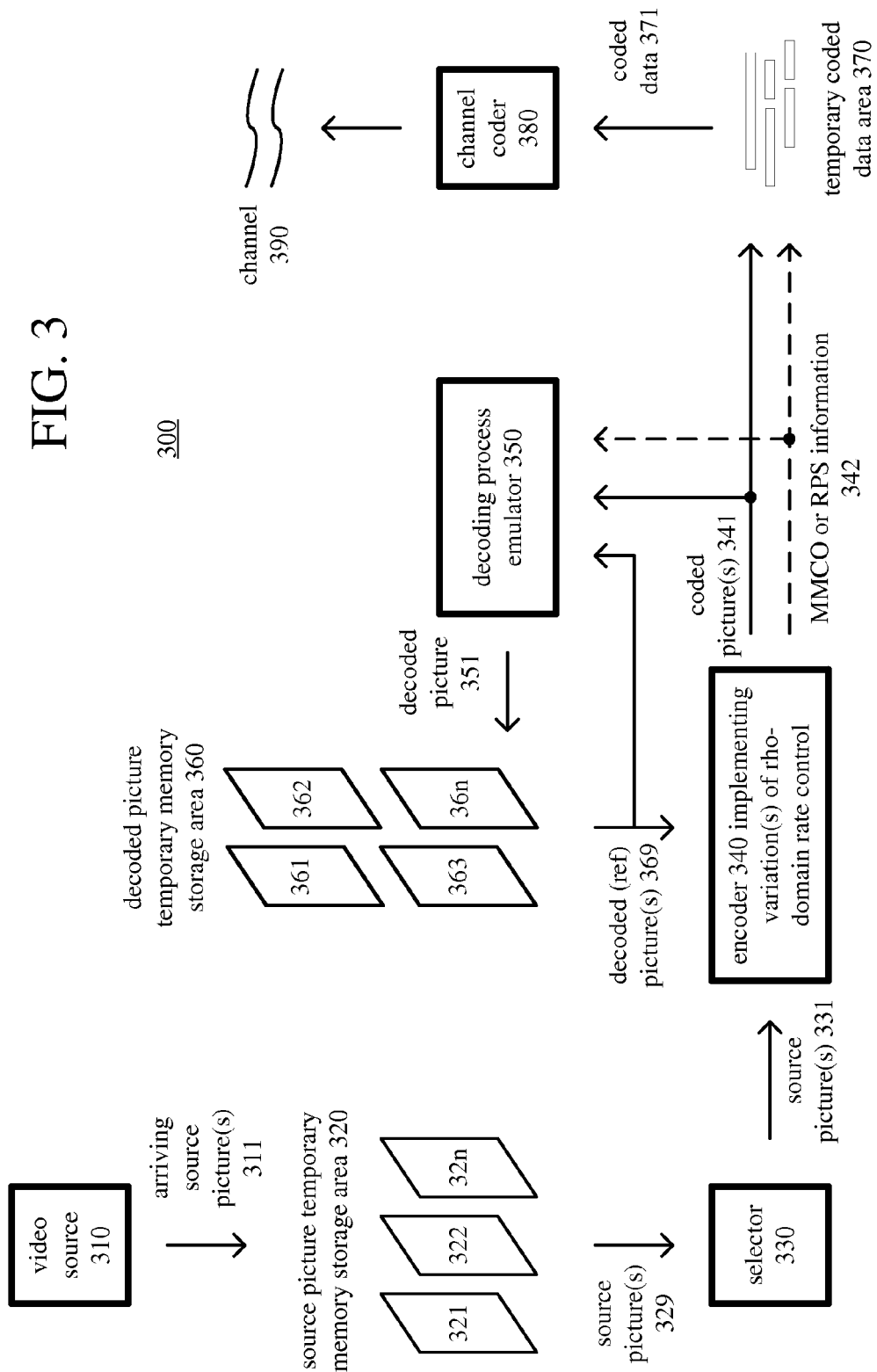
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication or remote desktop conferencing, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as part of an operating system module, as part of an application library, as part of a standalone application or using special-purpose hardware. The encoder system (300) can use one or more general-purpose processors (e.g., one or more CPUs) for some or all encoding operations, use graphics hardware (e.g., a GPU) for certain encoding operations, or use special-purpose hardware such as an ASIC for certain encoding operations. Overall, the encoder system (300) receives a sequence of source video pictures (311) from a video source (310) and produces encoded data as output to a channel (390). The encoded data output to the channel can include content encoded using rate control decisions as described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Before encoding, video may be converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation.

The encoder (340) encodes the selected picture (331) to produce a coded picture (341) and also produces memory management control operation ("MMCO") or reference picture set ("RPS") information (342). The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be a variation or extension of H.26x format (e.g., H.261, H.262, H.263, H.264, H.265), Windows Media Video format, VC-1 format, MPEG-x format (e.g., MPEG-1, MPEG-2, or MPEG-4), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding.

For syntax according to the H.264 standard, the encoder (340) can partition a picture into multiple slices of the same size or different sizes. The encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265 standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. A CU also has one or more transform units for purposes of residual coding/decoding, where a transform unit ("TU") has a luma transform block ("TB") and two chroma TBs. The encoder decides how to partition video into CTUs, CUs, PUs, TUs, etc.

As used herein, the term "block" can indicate a macroblock, residual data unit, CB, PB or TB, or some other set of sample values, depending on context. The term "unit" can indicate a macroblock, CTU, CU, PU, TU or some other set of blocks, or it can indicate a single block, depending on context, or it can indicate a slice, tile, picture, group of pictures, or other higher-level area.

Returning to FIG. 3, the encoder represents an intra-coded block of a source picture (331) in terms of prediction from other, previously reconstructed sample values in the picture (331). For intra spatial prediction for a block, the intra-picture estimator estimates extrapolation of the neighboring reconstructed sample values into the block. The intra-picture estimator can output prediction information (such as prediction mode/direction for intra spatial prediction), which is entropy coded. An intra-picture prediction predictor applies the prediction information to determine intra prediction values.

The encoder (340) represents an inter-picture coded, predicted block of a source picture (331) in terms of prediction from one or more reference pictures. A motion estimator estimates the motion of the block with respect to one or more reference pictures (369). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as MV information, which is entropy coded. A motion compensator applies MVs to reference pictures (369) to determine motion-compensated prediction values for inter-picture prediction.

The encoder (340) can determine the differences (if any) between a block's prediction values (intra or inter) and corresponding original values. These prediction residual values are further encoded using a frequency transform (if the frequency transform is not skipped) and quantization. For example, the encoder (340) sets values for quantization parameter ("QP") for a picture, tile, slice, macroblock, CU and/or other portion of video, and quantizes transform coefficients accordingly. Example approaches to selecting values of QP using variations of rho-domain rate control are described below.

An entropy coder of the encoder (340) compresses quantized transform coefficient values as well as certain side information (e.g., MV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. If the frequency transform is skipped, prediction residual values or input sample values can be quantized and entropy coded. If prediction is skipped for intra-picture coded content, transform coefficients computed from input sample values can be quantized and entropy coded.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoder (340) produces encoded data in an elementary bitstream. The syntax of the elementary bitstream is typically defined in a codec standard or format, or extension or variation thereof. As the output of the encoder (340), the elementary bitstream is typically packetized or organized in a container format, as explained below. The encoded data in the elementary bitstream includes syntax elements organized as syntax structures. In general, a syntax element can be any element of data, and a syntax structure is zero or more syntax elements in the elementary bitstream in a specified order.

For syntax according to the H.264 standard or H.265 standard, a picture parameter set ("PPS") is a syntax structure that contains syntax elements that may be associated with a picture. A PPS can be used for a single picture, or a PPS can be reused for multiple pictures in a sequence. A PPS typically includes a default or initial value of QP for the picture(s) associated with the PPS. In some implementations, different values of QP can be indicated for luma sample values and chroma sample values. A PPS is typically signaled separate from encoded data for a picture. Within the encoded data for a picture, a syntax element indicates which PPS to use for the picture. Similarly, for syntax according to the H.264 standard or H.265 standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

With reference to FIG. 3, the coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, ..., 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370) or other coded data buffer. The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders

Figure 4A:
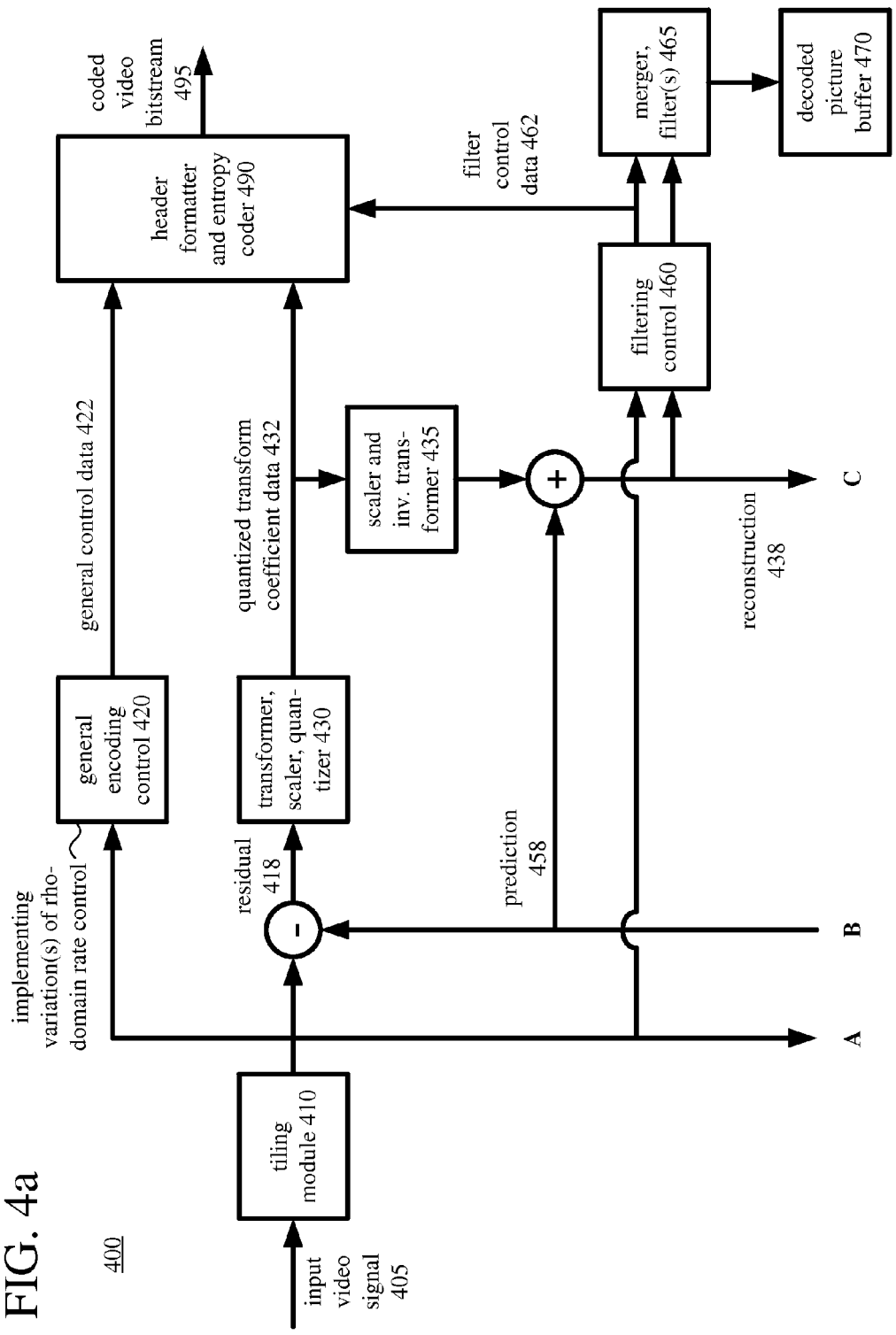
FIGS. 4a and 4b are diagrams illustrating an example video encoder in conjunction with which some described embodiments can be implemented.
Figure 4B:
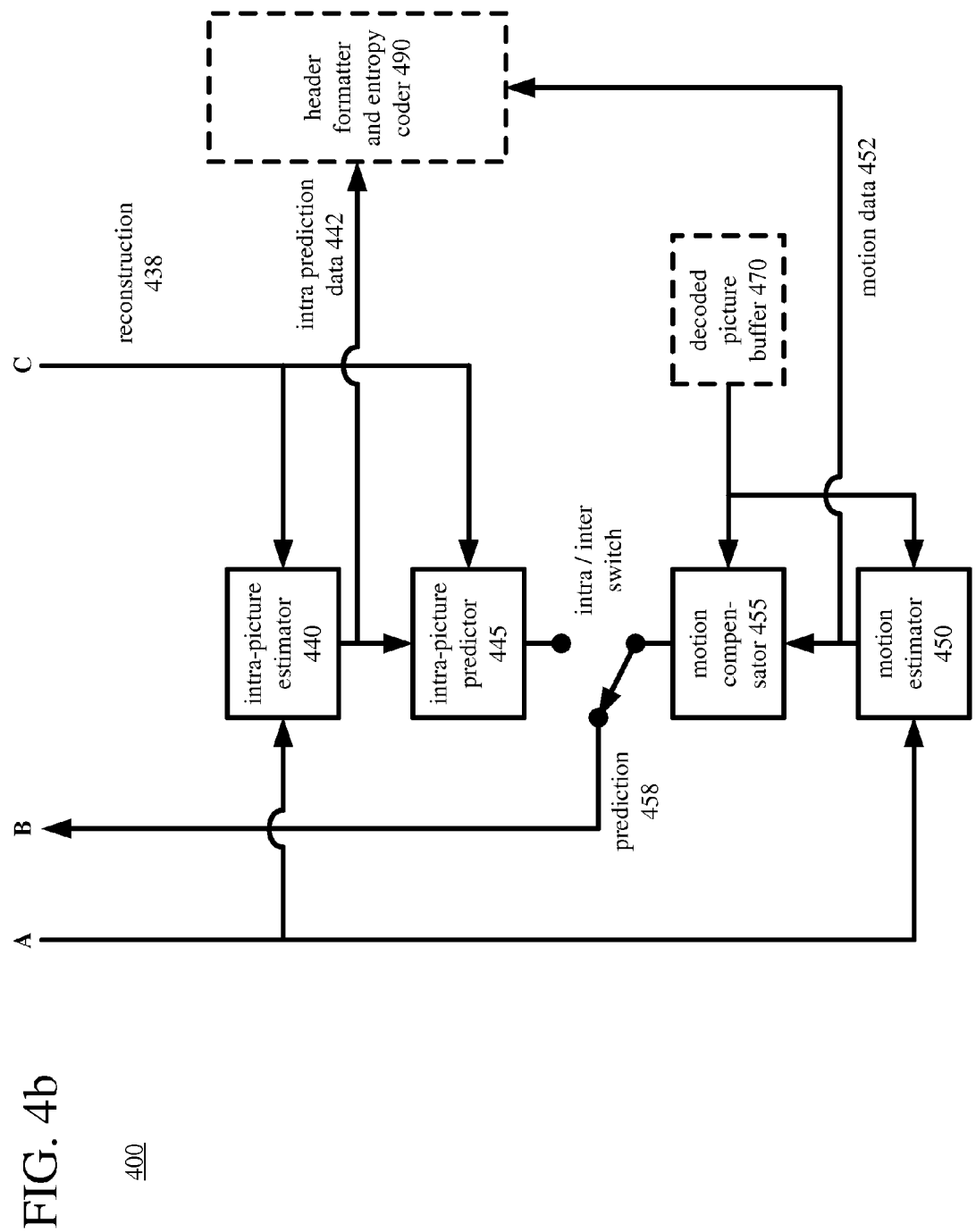

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding. In implementations of encoding for the H.264 standard, for example, the encoder partitions a picture into macroblocks, blocks, partitions (for inter-picture prediction), and residual data units. In implementations of encoding for the H.265 standard, for example, the encoder partitions a picture into CTUs (CTBs), CUs (CBs), PUs (PBs) and TU (TBs).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. The encoder (400) can also partition a picture into one or more slices, where each slice includes one or more slice segments. A slice header can include information indicating one or more values of QP for a slice (in some implementations, different values of QP can be indicated for luma sample values and chroma sample values of the slice).

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450) and intra/inter switch) to set and change coding parameters during encoding. In particular, the general encoding control (420) can set values of QP during encoding using one of the variations of rho-domain rate control presented herein. For example, the general encoding control (420) implements a rate controller configured to perform one of the techniques (1100, 1200, 1300) shown in FIGS. 11, 12, 13a and 13b. More generally, the general encoding control (420) can manage decisions about encoding modes during encoding. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures. The decoded picture buffer (470) buffers one or more reconstructed previously coded pictures for use as reference pictures. When multiple reference pictures are used, the multiple reference pictures can be from different temporal directions or the same temporal direction. The motion estimator (450) produces as side information motion data (452) such as MV data, merge mode index values, and reference picture selection data. The motion data (452) is provided to the header formatter/entropy coder (490) as well as the motion compensator (455).

The motion compensator (455) applies MVs to the reconstructed reference picture(s) from the decoded picture buffer (470). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture (e.g., determine the direction of spatial prediction to use for a current block). The intra-picture estimator (440) produces as side information intra prediction data (442), such as information indicating whether intra prediction uses spatial prediction or another type of intra coding, prediction mode/direction (for intra spatial prediction). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture.

The intra/inter switch selects whether the prediction (458) for a given block will be a motion-compensated prediction or intra-picture prediction.

The difference (if any) between a block of the prediction (458) and a corresponding part of the original current picture of the input video signal (405) provides values of the residual (418), for a non-skip-mode block. During reconstruction of the current picture, for a non-skip-mode block, reconstructed residual values are combined with the prediction (458) to produce an approximate or exact reconstruction (438) of the original content from the video signal (405). (In lossy compression, some information is lost from the video signal (405).)

In the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. In examples described below, the frequency transformer is configured to compute transform coefficients for a unit of media (e.g., a group of pictures, picture, macroblock, coding unit, block, etc.). The frequency transform that is applied can have multiple location-dependent scale factors. The transformer/scaler/quantizer (430) can apply a transform with variable block sizes. In this case, the transformer/scaler/quantizer (430) can determine which block sizes of transforms to use for the residual values for a current block. The encoder (400) can also skip the transform step in some cases.

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, macroblock-by-macroblock basis, CU-by-CU basis, block-by-block basis, or other basis. In examples described below, the scaler/quantizer is configured to quantize transform coefficients for a unit of media using a value of QP for the unit. In general, a quantization step size is determined using a value of QP according to a defined relationship between QP and quantization step size, and the quantization step size may also incorporate a scale factor that depends on the frequency transform used (e.g., one of multiple scale factors to compensate for different amounts of expansion in the frequency transform for different coefficients). The value of QP can be set using one of the variations of rho-domain rate control presented herein. Transform coefficients can also be scaled or otherwise quantized using other scale factors (e.g., weights in a weight matrix). The quantized transform coefficient data (432) is provided to the header formatter/entropy coder (490).

In the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. For a non-skip-mode block, the encoder (400) combines reconstructed residual values with values of the prediction (458) (e.g., motion-compensated prediction values, intra-picture prediction values) to form the reconstruction (438). For a skip-mode block, the encoder (400) uses the values of the prediction (458) as the reconstruction (438).

For intra-picture prediction, the values of the reconstruction (438) can be fed back to the intra-picture estimator (440) and intra-picture predictor (445). Also, the values of the reconstruction (438) can be used for motion-compensated prediction of subsequent pictures. The values of the reconstruction (438) can be further filtered. A filtering control (460) determines how to perform deblock filtering and SAO filtering on values of the reconstruction (438), for a given picture of the video signal (405). The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering and SAO filtering according to the filter control data (462), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (400), and the encoder (400) may provide syntax within the coded bitstream to indicate whether or not such filtering was applied. The decoded picture buffer (470) buffers the reconstructed current picture for use in subsequent motion-compensated prediction.

The header formatter/entropy coder (490) formats and/or entropy codes the general control data (422), quantized transform coefficient data (432), intra prediction data (442), motion data (452) and filter control data (462). The header formatter/entropy coder (490) provides the encoded data in the coded video bitstream (495). The format of the coded video bitstream (495) can be a variation or extension of H.26x format (e.g., H.261, H.262, H.263, H.264, H.265), Windows Media Video format, VC-1 format, MPEG-x format (e.g., MPEG-1, MPEG-2, or MPEG-4), or another format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Variations of Rho-domain Rate Control

This section describes variations of rho-domain rate control for video encoding or other media encoding. For example, in some of the variations of rho-domain rate control, computational complexity is reduced by using a location-independent scale factor that approximates multiple location-dependent scale factors. As another example, in other variations of rho-domain rate control, computational complexity is reduced by integrating certain scaling operations when generating a mapping of QP values to rho values.

A. Introduction to Rate Control Approaches

An encoder uses rate control to manage bit rate and quality during encoding. For most standards and formats, the encoder sets a QP for a picture or portion of a picture (such as a slice, macroblock, coding unit, or block), which affects bit rate and quality for that picture or portion thereof. In such standards and formats, both bit rate and distortion depend on the value of QP, and an encoder can set a tradeoff between bit rate and distortion by selecting an appropriate value of QP for the picture or portion thereof.

For certain encoding scenarios (such as remote desktop presentation, in which screen content video is encoded), rate control that provides consistent bit rate and good quality of reconstructed video under target bit rate constraints is an important goal. In such scenarios, however, many previous rate control approaches fall short of optimal quality for a target bit rate, or fail to consistently produce encoded video at the target bit rate, or fail to adapt quickly to scene changes in the video. For example, according to some previous rate control approaches, stationary screen content video that is encoded at a low bit rate typically fails to achieve satisfying quality for reconstructed video. As another example, previous rate control approaches often rely on information from a previous picture, and they do not adapt well to abrupt scene changes in screen content video.

Another category of rate control approaches uses rho-domain rate control, which can provide consistent bit rate and good quality of reconstructed video under various target bit rate constraints. In rho-domain rate control, an encoder uses a rho value to control bit rate and quality for a picture or a portion of a picture (such as a slice, macroblock, coding unit, or block). The rho value is, for example, the proportion of zero-value coefficients among the quantized transform coefficients for the picture or portion thereof. The rho value is useful as a control value because a linear relationship between rho values and real bit rates has been observed in many encoding scenarios, for many types of video content. As such, the rho value is strongly indicative of final bit rate.

During rho-domain rate control, an encoder sets a rho value for a unit of video (such as a group of pictures, picture, slice, macroblock, coding unit, or block) based at least in part on a bit allocation for the unit. The bit allocation can depend on coding type (e.g., I, P, or B), spatial complexity of the unit (e.g., fine texture/details versus simple patterns), content classification (e.g., background versus foreground, text versus natural video object), available bit rate for transmission, fullness of a coded data buffer of the encoder, and/or other factors. The encoder can directly set the bit allocation for the unit, or the encoder can prorate a bit allocation that was set for a larger area (which includes the unit). In any case, the rho value can indicate a target proportion of zero-value quantized transform coefficients for the unit, considering the bit allocation. To set the rho value for the unit, the encoder can use a mapping between candidate values of bit allocation (that is, possible bit allocations) and corresponding rho values for those candidate values of bit allocation. For example, the encoder looks up the bit allocation for the unit in a bits-rho mapping, and finds the corresponding rho value, or the encoder directly calculates the rho value from the bit allocation according to a bits-rho mapping.

In typical video encoding scenarios, for various types of video content, transform coefficients for prediction residuals have a Gaussian or Laplace distribution. For transform coefficients that have a Laplace distribution, for example, the relationship between rho ($\rho$) value and bit rate (R) can be quantified as: $R(\rho)=2\times\log_2 e(1-\rho)+O([(1-\rho)]^3)$, where the rho value indicates a proportion of zero-value quantized transform coefficients. With transform coefficients that have a Gaussian or Laplace distribution, the relationship between rho value and bit rate can be simplified as the linear relationship: $R(\rho)=\theta\times(1-\rho)$, where $\theta$ is the slope of the linear relationship, and where the rho value indicates a proportion of zero-value quantized transform coefficients.

Figure 5:
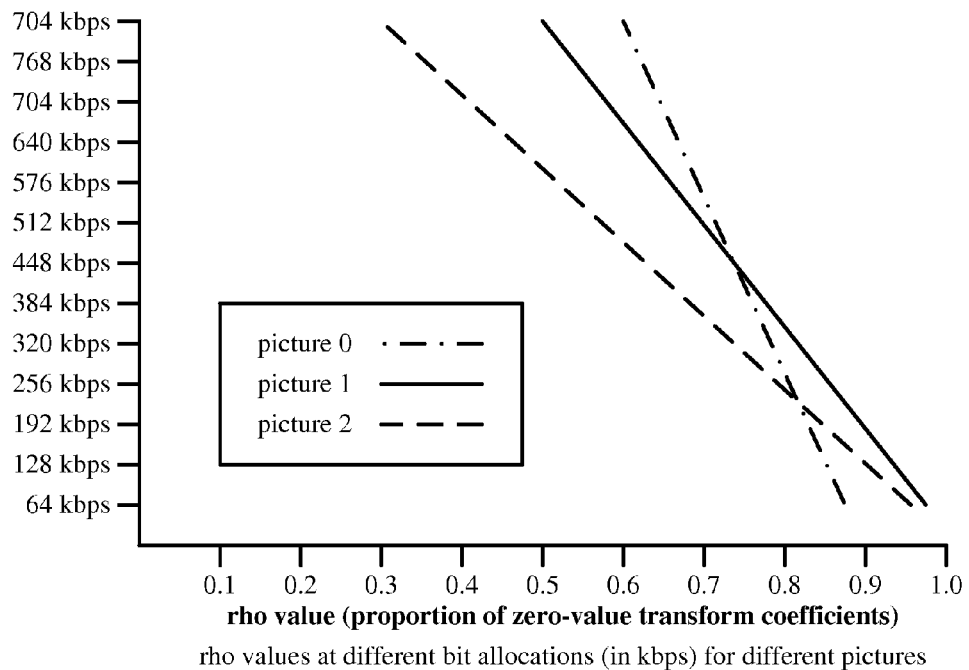
FIG. 5 is a chart illustrating an example mapping of bit allocation values to corresponding rho values.

FIG. 5 shows an example mapping (500) of bit allocations to corresponding rho values for three different video pictures. More specifically, FIG. 5 shows rho values at different bit allocations for the three video pictures, from 64 kilobits per second (kbps) to 704 kbps. The three pictures could be pictures from three different video sequences, or they could be three different pictures from a single video sequence. In FIG. 5, the rho values indicate proportion of zero-value quantized transform coefficients, and the rho values increase as bit allocation decreases. For each of the three pictures, the value of θ is different. Picture 0 has the steepest slope. At the lowest bit allocation, the rho value for picture 0 is about 0.88 (that is, about 88% of the transform coefficients are quantized to zero at the lowest bit allocation). At the highest bit allocation, the rho value for picture 0 is about 0.60 (that is, about 60% of the transform coefficients are quantized to zero at the highest bit allocation). Picture 2 has the flattest slope. At the lowest bit allocation, the rho value for picture 2 is about 0.96 (that is, about 96% of the transform coefficients are quantized to zero at the lowest bit allocation). At the highest bit allocation, the rho value for picture 2 is about 0.30 (that is, about 30% of the transform coefficients are quantized to zero at the highest bit allocation). Between the lowest and highest bit allocations for a given picture, the relationship between bit allocation and rho value is roughly linear because the number of non-zero coefficients being encoded in the bitstream changes at a linear rate, and roughly the same number of bits is used per non-zero coefficient. The value of θ is different for the three pictures due to different characteristics of the content in the respective pictures. As such, the value of θ for a given picture depends on the number of bits per non-zero coefficient for that picture.

FIG. 5 shows examples of mappings between bit rates (or bit allocations) and corresponding rho values for pictures. Alternatively, an encoder determines and uses mappings between bit rates (or bit allocations) and corresponding rho values for groups of pictures, slices, macroblocks, coding units, blocks, or some other unit of video.

After setting the rho value for a unit, the encoder determines an appropriate value of QP to use during quantization. For rho-domain rate control, like other rate control approaches, an encoder sets a tradeoff between bit rate and distortion by selecting an appropriate value of QP for a picture or portion thereof. To facilitate selection of an appropriate QP value given a rho value, the encoder determines a mapping between candidate values of QP (that is, values of QP that the encoder may use for the unit) and corresponding rho values for those candidate values of QP, respectively. Like the bits-rho mapping, the QP-rho mapping is content-dependent. Unlike the bits-rho mapping, however, the QP-rho mapping is usually not linear.

To determine the QP-rho mapping, the encoder computes transform coefficients for the unit using a frequency transform. In general, the encoder determines a count of zero-value transform coefficients when a given value of QP is used for quantization, by estimating the count of zero-value transform coefficients or by actually calculating the count of zero-value transform coefficients. For example, FIG. 6 shows a histogram (600) of counts of zero-value transform coefficients for a picture at different candidate values of QP, from QP=1 to QP=51. In the example shown in FIG. 6, considering the large number of transform coefficients, the count of zero-value transform coefficients increases monotonically as QP increases. More generally, the count of zero-value transform coefficients for a given unit either increases or stays the same as QP increases. It follows that rho value for a given unit, when the rho value indicates proportion of zero-value transform coefficients, either increases or stays the same as QP increases.

Figure 7:
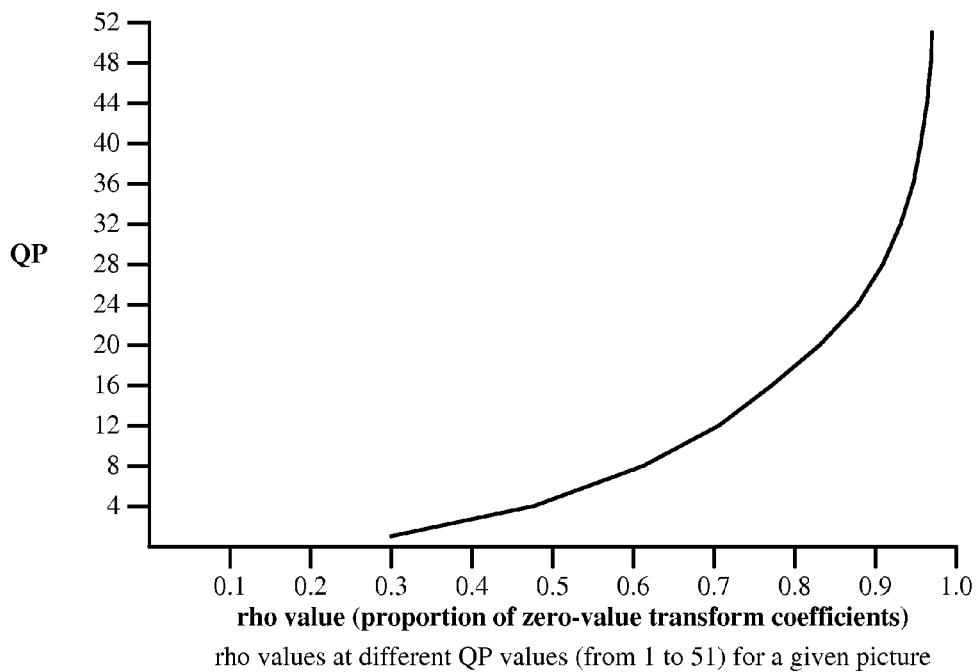
FIG. 7 is a chart illustrating an example mapping of candidate QP values to corresponding rho values.

Based on the counts, the encoder sets corresponding rho values for the candidate values of QP. FIG. 7 shows an example mapping (700) of candidate QP values to corresponding rho values based on the histogram (600) in FIG. 6. For QP=1 to QP=51, the mapping (700) indicates a corresponding rho value based on the proportion of zero-value transform coefficients when that value of QP is used. In FIG. 7, the rho values increase as QP increases.

FIG. 7 shows an example of a mapping between QP values and corresponding rho values for a picture. Alternatively, an encoder determines and uses mappings between QP values and corresponding rho values for groups of pictures, slices, macroblocks, coding units, blocks, or some other unit of video.

For rho-domain rate control, the encoder sets a value of QP for the unit by locating, in the QP-rho mapping, the rho value that was set for the unit based on the bit allocation. In this way, the encoder finds an appropriate value of QP for the unit. The encoder uses that value of QP for the unit during quantization of the transform coefficients for the unit.

FIG. 8 illustrates an example of the relationship (800) between a target bit allocation value, corresponding rho value, and QP value. The top half of FIG. 8 shows the mapping between bit rates (bit allocations) and corresponding rho values for picture 0 in FIG. 5. The bottom half of FIG. 8 shows the mapping (700) between QP values and corresponding rho values from FIG. 7. For a target bit allocation (416 kbps in the example of FIG. 8), the encoder finds a corresponding rho value (0.66 in the example of FIG. 8). Then, for the corresponding rho value, the encoder finds an appropriate QP value (10 in the example of FIG. 8).

In practice, the process of determining a QP-rho mapping used by an encoder for rho-domain rate control can be computationally intensive. To illustrate, consider the following example of rho-domain rate control in which a QP-rho mapping is determined on a macroblock-by-macroblock basis for encoding of H.264 video. The encoder determines the relation between rho values and QP values according to the following equations for intra-coded macroblocks and inter-coded macroblocks, respectively:

$$rho(QP)_{intra} = \frac{1}{M} \sum_{x \in intraMB} \left( \begin{cases} 1 & \text{if } |x| < itable_{intra}(i, j, QP) \\ 0 & \text{else} \end{cases} \right), \text{ and}$$

$$rho(QP)_{inter} = \frac{1}{M} \sum_{x \in interMB} \left( \begin{cases} 1 & \text{if } |x| < itable_{inter}(i, j, QP) \\ 0 & \text{else} \end{cases} \right),$$

where x is a transform coefficient at position (i, j) for a macroblock, M indicates the count of transform coefficients in the macroblock, QP indicates a candidate QP value, and the rho value indicates a proportion of zero-value transform coefficients. For example, a macroblock in YUV 4:2:0 format includes six blocks of 64 transform coefficients, or 384 transform coefficients total. The structures $itable_{intra}$ and $itable_{inter}$ are lookup tables. Given inputs i, j, and QP, a selected one of the tables returns a quantization step size. For a given candidate value of QP, the encoder compares the absolute value of each transform coefficient x to the appropriate quantization step size for the transform coefficient. If the absolute value of the transform coefficient x is less than the quantization step size, the transform coefficient x will be quantized to zero, and it is counted as a zero-value transform coefficient. Otherwise (the absolute value of the transform coefficient x is not less than the quantization step size), the transform coefficient x will not be quantized to zero, and it is not counted as a zero-value transform coefficient. The rho value for the candidate value of QP is determined by dividing the count of zero-value transform coefficients in the macroblock by the count M of transform coefficients in the macroblock.

The quantization step sizes can be different for intra-coded blocks and inter-coded blocks. In the preceding example, the structure $itable_{intra}$ is used for intra-coded macroblocks, and the structure $itable_{inter}$ is used for inter-coded macroblocks. The quantization step size returned by $itable_{intra}$ or $itable_{inter}$ incorporates a uniform quantization scale that depends on QP. The returned quantization step size also incorporates a location-dependent scale factor that depends on the position (i, j) of the transform coefficient x. The location-dependent scale factor is one of three different scale factors, which compensate for expansion due to the norms of the rows/columns of the frequency transform. For a 4×4 residual block of a block of the macroblock, for example, the first scale factor is used for transform coefficients at positions (0,0), (0,2), (2,0), and (2,2), the second scale factor is used for transform coefficients at positions (0,1), (0,3), (1,0), (1,2), (2,1), (2,3), (3,0), and (3,2), and the third scale factor is used for transform coefficients at positions (1,1), (1,3), (3,1), and (3,3). Thus, the table $itable_{intra}$ uses three classes for quantization step sizes, depending on coefficient position, and the table $itable_{inter}$ uses three classes for quantization step size, depending on coefficient position.

For the HEVC standard, an encoder can similarly calculate the relation between rho values and QP values for coding units. Alternatively, a single lookup table can be used for both intra-coded macroblocks (or coding units) and inter-coded macroblocks (or coding units).

In any case, the use of location-dependent scale factors can make the computational cost of rho-domain rate control prohibitive. Some attempts have been made to reduce the complexity of rho-domain rate control, e.g., using location-aware lookup tables in which a different lookup table is used for each of the different classes. Even if such attempts reduce the computational complexity of rho-domain rate control in some architectures, they cannot be applied easily to other architectures that provide opportunities for caching and parallel computation.

B. New Variations of Rho-domain Rate Control

The process of determining QP-rho mappings can be simplified in various respects, which reduces the computational complexity of rho-domain rate control, while still supporting rate control decisions that are almost as accurate as those of previous, more complex versions of rho-domain rate control. The simplifications also facilitate efficient implementations on architectures that provide opportunities for caching and parallel computation. In particular, efficient variations of rho-domain rate control can be implemented using various combinations of special-purpose hardware and software, including an ASIC, a GPU, or a CPU executing SIMD instructions for parallel processing.

1. Location-Independent Scale Factor

According to a first innovation, an encoder uses a location-independent scale factor when determining a QP-rho mapping. The location-independent scale factor approximates multiple location-dependent scale factors for the frequency transform used during encoding. The location-independent scale factor can be the average, median, or weighted average of the multiple location-dependent scale factors. Or, the location-independent scale factor can be some other representative value that approximates the multiple location-dependent scale factors. Typically, the location-independent scale factor is determined at design time based on the multiple location-dependent scale factors for the frequency transform. The location-independent scale factor can then be integrated into operations performed to determine QP-rho mappings, which avoids location dependencies in finding scale factors. This reduces the computational complexity of rho-domain rate control, while still supporting accurate rate control decisions.

For example, consider the following 4×4 forward transform, in which X represents a 4× array of prediction residual values in the spatial domain, in which C represents a one-dimensional transform, and in which $C^T$ represents its transpose.

$$Y = CXC^T = \begin{bmatrix} a & a & a & a \\ b & c & -c & -b \\ a & -a & -a & a \\ c & -b & b & -c \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \begin{bmatrix} a & b & a & c \\ a & c & -a & -b \\ a & -c & -a & b \\ a & -b & a & -c \end{bmatrix},$$

where $$a = \frac{1}{2}, b = \sqrt{\frac{1}{2}} \cos\left(\frac{\pi}{8}\right), \text{ and } c = \sqrt{\frac{1}{2}} \cos\left(\frac{3\pi}{8}\right).$$

This transform can be factorized as:

$$\begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix} \otimes \begin{bmatrix} a^2 & ab/2 & a^2 & ac \\ ab/2 & c^2 & ac & b^2/4 \\ a^2 & ac & a^2 & ab/2 \\ ac & b^2/4 & ab/2 & c^2 \end{bmatrix},$$

where $\otimes$ represents a dot multiply operation. The rightmost matrix is a scale matrix that includes five location-dependent scale factors for the transform: $a^2$, $ab/2$, $ac$, $c^2$, and $b^2/4$. Using these five scale factors when determining QP-rho mappings can add significant computational complexity and memory costs to rho-domain rate control due to location dependencies. To simplify rho-domain rate control, the location-dependent scale factors can be replaced with a single location-independent scale factor that approximates them, e.g., the average of the location-dependent scale factors $((4 \times a^2 + 4 \times ab/2 + 4 \times ac + 2 \times c^2 + 2 \times b^2/4)/16$, which is roughly 0.1596), or the median of the location-dependent scale factors (median($a^2$, $ab/2$, $ac$, $c^2$, $b^2/4$), which is roughly 0.1353). Or, the location-independent scale factor is a weighted average of the location-dependent scale factors, e.g., giving more weight to the scale factor used for the DC coefficient.

As another example, the transform can be factorized and approximated as:

$$\begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix} \otimes \begin{bmatrix} a^2 & ab/2 & a^2 & ab/2 \\ ab/2 & b^2/4 & ab/2 & b^2/4 \\ a^2 & ab/2 & a^2 & ab/2 \\ ab/2 & b^2/4 & ab/2 & b^2/4 \end{bmatrix},$$

where c is approximated as b/2. The right-most matrix is a scale matrix that includes three location-dependent scale factors for the transform: $a^2$, $ab/2$, and $b^2/4$. Again, to simplify rho-domain rate control, the location-dependent scale factors can be replaced with a single location-independent scale factor that approximates the location-dependent scale factors. For example, the location-independent scale factor is the average of the location-dependent scale factors $((4 \times a^2 + 8 \times ab/2 + 4 \times b^2/4)/16$, which is roughly 0.1708), the median of the location-dependent scale factors (median($a^2$, $ab/2$, $b^2/4$), which is roughly 0.1633), or a weighted average of the location-dependent scale factors, e.g., giving more weight to the scale factor used for the DC coefficient.

For another frequency transform having different location-dependent scale factors, the location-independent scale factor is adapted accordingly, to approximate those location-dependent scale factors.

When determining a QP-rho mapping, the location-independent scale factor can be used instead of the multiple location-dependent scale factors, avoiding location dependencies. For example, the location-independent scale factor is incorporated into a simpler lookup table itable$_{intra}$ or itable$_{intra}$, which is indexed by only QP. Or, the location-independent scale factor is incorporated into scaling operations when determining a QP-rho mapping, as described in the next section.

2. Integrating Scaling Operations when Determining QP-Rho Mapping

According to a second innovation, an encoder integrates certain scaling operations when determining a QP-rho mapping. This can facilitate efficient implementations on architectures that provide opportunities for caching and parallel computation. It also reduces the computational complexity of rho-domain rate control, while still supporting accurate rate control decisions.

In encoder implementations for some standards and formats, a quantization step size depends on a quantization scale derived from a value of QP and also depends on a frequency transform-specific scale factor. In general, the quantization scale ("Qscale") relates to the QP value (QP) according to the relation: Qscale(QP)=$2^{(QP-6)/6}$. It follows that Qscale(QP+6)=2×Qscale(QP). That is, Qscale doubles for every increase of 6 in the value of QP. By taking the $\log_2$ of each side, the relation Qscale=$2^{(QP-6)/6}$ becomes $\log_2$(Qscale)=$\log_2(2^{(QP-6)/6})$=(QP-6)/6, or QP=6×$\log_2$(Qscale)+6. With the addition of a transform-dependent scale factor (shown as a scale factor sf), the relation between QP and the quantization step size applied to a transform coefficient is QP=6×$\log_2$(Qscale×sf)+6, where Qscale×sf corresponds to the quantization step size. For example, for a location-independent scale factor m, the relation is QP=6×$\log_2$(Qscale×m)+6.

When determining a QP-rho mapping, the encoder can use this relation to simplify processing. For example, the equations presented in section V.A for determining QP-rho mappings for intra-coded macroblocks or inter-coded macroblocks are modified as follows.

$$rho(QP)_{intra} = \frac{1}{M} \sum_{x \in intraMB} \left( \begin{cases} 1 & \text{if } |6 \times \log_2(x \times sf) + 6| < QP \\ 0 & \text{else} \end{cases} \right), \text{ and}$$

$$rho(QP)_{inter} = \frac{1}{M} \sum_{x \in interMB} \left( \begin{cases} 1 & \text{if } |6 \times \log_2(x \times sf) + 6| < QP \\ 0 & \text{else} \end{cases} \right),$$

where x is a transform coefficient at position (i, j) for a macroblock, M indicates the count of transform coefficients in the macroblock, QP indicates a candidate QP value, and rho value indicates a proportion of zero-value transform coefficients. The scale factor sf can be a location-independent scale factor m. Or, the scale factor sf can be a location-dependent scale factor, which is set depending on the location (i, j). For a given candidate value of QP, the encoder compares the absolute value of 6×$\log_2$(x×sf)+6 to the candidate value of QP. If the absolute value of 6×$\log_2$(x×sf)+6 is less than the candidate value of QP, the transform coefficient x will be quantized to zero, and it is counted as a zero-value transform coefficient. Otherwise (the absolute value of 6×$\log_2$(x×sf)+6 is not less than the candidate value of QP), the transform coefficient x will not be quantized to zero, and it is not counted as a zero-value transform coefficient. The rho value for the candidate value of QP is determined by dividing the count of zero-value transform coefficients in the macroblock by the count M of transform coefficients in the macroblock.

In practice, instead of computing the rho value per candidate QP value for a macroblock or other unit, on a coefficient-by-coefficient basis, the encoder can use the value 6×$\log_2$(x×sf)+6 to calculate the lowest value of QP at which a given transform coefficient x is quantized to zero. For example, suppose the transform coefficient is x=50, and the scale factor is sf=0.1581. The encoder can calculate, as the threshold QP value, the lowest value of QP at which the transform coefficient is quantized to zero as 6×$\log_2$(50×0.1581)+6=23.896≈24. From the threshold QP value for the transform coefficient x, the encoder can identify other QP values at which the transform coefficient x is quantized to zero (e.g., QP values higher than the threshold QP value) and/or identify QP values at which the transform coefficient x is not quantized to zero (e.g., QP values lower than the threshold QP value). For example, if the threshold QP value for a given transform coefficient is 24, that transform coefficient is also quantized to zero if the QP value is 25, 26, 27, and so on, but the transform coefficient is not quantized to zero if the QP value is 23, 22, 21, and so on.

The encoder can repeat this process for other transform coefficients in the macroblock or other unit. The total counts of zero-value coefficients per candidate QP value can be tracked in a histogram or other data structure with a "bin" per candidate QP value. The encoder can then determine rho values for the respective candidate QP values based on the total counts of zero-value coefficients for the macroblock or other unit, under the respective candidate QP values. For example, suppose the bin for a given candidate QP value includes 1,866,240 zero-value transform coefficients from among 3,111,040 transform coefficients. The encoder sets a rho value of 0.6 for the candidate QP value, where the rho value indicates the proportion of zero-value coefficients.

To this end, the encoder can implement the process of determining the threshold QP value (lowest QP value at which a given transform coefficient x is quantized to zero) using computer-executable instructions that approximate the value $\log_2(x \times sf)$, during rho-domain rate control. FIG. 9A shows a C code listing (900) for a general approach to determining $\log_2(x)$ for a transform coefficient x, which is an integer. The approach approximates $\log_2(x)$ using floating point operations. The final value v gives the approximation of $\log_2(x)$.

The operations implemented in the C code listing (900) shown in FIG. 9a are derived as follows. Suppose n is a number in single-precision, floating-point representation. In the single-precision, floating-point representation, n has a sign value sign, a fractional component m, and an exponent e. In general, $n=(-1)^{sign} \times m \times 2^e$. With 32-bit precision, n can be represented with a single bit for the sign value, 8 bits for the exponent value e', and 23 bits for the mantissa value m (for the fractional part of the floating-point value). From the 32 bits of information, the value of n can be reconstructed according to the following formula.

$$n = (-1)^{sign} \times \left(1 + \sum_{i=1}^{23} b_{23-i} 2^{-i}\right) \times 2^{e'-127},$$

where the bits $b_{22} \ldots b_0$ are bits for the mantissa value m. For example, for the value 0011 1110 0010 0000 0000 0000 0000 0000, the first bit (0) indicates a positive sign, the next eight bits 0111 1100 indicate an exponent value e' of 124 for an exponent of e=124−127=−3, and the last 23 bits indicate (in least-significant bit format) a fractional part of 1+0+ 0.25+0+ . . . +0=1.25. The reconstructed value is $n=(-1)^{sign} \times 1.25 \times 2^{-3}=0.15625$.

The base-2 logarithm for a positive value $n=m \times 2^e$ is $\log_2(n)=\log_2(m)+e$, or $\log_2(n)=\log_2(m)+e'-127$. In this representation, the fractional part m (that is, $$1 + \sum_{i=1}^{23} b_{23-i} 2^{-i})$$

has a range of [1, 2). For different values of m in this range, known values of $\log_2(m)$ are $\log_2(1)=0$, $\log_2(3/2)=0.5849625$, and $\log_2(2)=1$. Suppose $\log_2(m)$ is approximated by the polynomial $\log_2(m) \approx a \times m^2 + b \times m + c$. For this approximation:

$$a + b + c = 0, \text{ for } \log_2(1),$$

$$\frac{9}{4}a + \frac{3}{2}b + c = 0.5849625, \text{ for } \log_2\left(\frac{3}{2}\right), \text{ and}$$

$$4a + 2b + c = 1, \text{ for } \log_2(2).$$

Solving these equations, the values of the factors a, b, and c are $a=-0.33958 \approx -1/3$, $b=2.01955 \approx 2$, and $c=-1.6797 \approx -5/3$. Recalling that $\log_2(n)=\log_2(m)+e$, substituting these values for a, b, and c into the equation $\log_2(n)=a \times m^2 + b \times m + c + e' - 127$ yields $$\log_2(n) = \frac{-1}{3} \times m^2 + 2 \times m - \frac{5}{3} + e' - 127.$$

In the C code listing of FIG. 9a, the expression (n>>23) & 255) recovers the value of e' from bits 2-9 of a value in the 32-bit representation described above, and thus the expression e=((n>>23) & 255)−127 recovers the value of e=e'−127. In the C code listing of FIG. 9a, the expression n &=0x007FFFFF recovers the value of m from bits 10-32 of the value in the 32-bit representation described above. The expression n+=0x3F800000 adds seven 1 bits at bit positions 3-9, which will be interpreted as an exponent value of e'=127 when the value is recast as a floating-point value, such that the value of n is effectively unchanged. Finally, the expression v=(−1.0/3.0*r+2.0)*r−5.0/3.0+e, yields the base-2 logarithm of the input value.

FIG. 9b shows a C code listing (910) for an approach to determining $6 \times \log_2(x \times sf) + 6$ for a transform coefficient x, which is initially an integer but cast as a floating-point number, and scale factor sf, which is a floating point number. For example, the scale factor sf is a location-independent scale factor. The code listing (910) in FIG. 9b is based on the code listing (900) in FIG. 9a, but the first and last lines have been modified. (In FIG. 9b, the intermediate variable r is also replaced with the variable Qm.) In the first line, the product x×sf is calculated. In the last line, the final value v gives an approximation of $6 \times \log_2(x \times sf) + 6$, taking the last line of the code listing (900) in FIG. 9a as the approximation of $\log_2(x \times sf)$:

$$6 \times \left(\left(\frac{-1.0}{3.0} \times Qm + 2.0\right) \times Qm - \frac{5.0}{3.0} + e\right) + 6 =$$

$$(-2.0 \times Qm + 12.0) \times Qm - 4 + 6 \times e.$$

In FIG. 9b, the character f after a numerical value indicates the numerical value is a floating point value.

3. Combined Implementation for Parallel Processing

FIG. 10 is a SSE-2 code listing (1000) illustrating another approach to determining the threshold QP value (lowest QP value at which a transform coefficient is quantized to zero) during rho-domain rate control. The SSE-2 code listing (1000) includes SIMD instructions that can compute the threshold QP values for multiple transform coefficients in parallel. The SIMD instructions include scaling by a location-independent scale factor of 0.1581. The SIMD instructions also integrate scaling operations.

For a set of eight 16-bit transform coefficients packed into the 128-bit variable e, the encoder determines corresponding threshold QP values at which the respective transform coefficients are quantized to zero. Using first operations (1001), the encoder unpacks the eight 16-bit transform coefficients from the 128-bit variable e into eight 32-bit integer values. With the_mm_unpacklo_epi16 operation, the lower four 16-bit integer values in the variable e are interleaved with 16-bit values of 0xFFFF or 0x0000 (depending on whether the respective lower four 16-bit integer values are negative or positive) and stored in the variable m. Then, with the_mm_unpackhi_epi16 operation, the upper four 16-bit integer values in the variable e are interleaved with 16-bit values of 0xFFFF or 0x0000 (depending on whether the respective upper four 16-bit integer values are negative or positive) and stored in the variable e. At this point, each of the variables m and e stores four signed 32-bit integer values for four transform coefficients.

Using the next operations (1002), the encoder converts the 32-bit integer values for the transform coefficients into single-precision floating point values. For the four "lower" transform coefficients, the variable k stores four single-precision floating point values for the four signed 32-bit integer values in the variable m. For the four "upper" transform coefficients, the variable l stores four single-precision floating point values for the four signed 32-bit integer values in the variable e.

Then, with other operations (1003), the encoder scales each of the transform coefficient values by the scale factor 0.1581, which is a location-independent scale factor. At this point, for the four "lower" transform coefficients, the variable k stores four scaled values. For the four "upper" transform coefficients, the variable l stores four scaled values.

Next, using operations (1004) based on operations in the code listing (910) in FIG. 9b, for a first group of four transform coefficients (the four "lower" transform coefficients), the encoder computes threshold QP values (lowest QP values at which the respective transform coefficients are quantized to zero). The four single-precision floating point numbers in the variable k (representing scaled values) are cast as 32-bit integer values, which are stored in the variable m. For the four 32-bit integer values, exponent values are extracted (using the mm_srli_epi32 operation), stored in the variable e, and further adjusted. Four mantissa values are formatted in the variable m and cast as single-precision floating point numbers, which are stored in the variable k (k=_mm_castsi128_ps(m)). The four mantissa values (in the variable k) and four exponent values (in the variable e) are adjusted to compute four threshold QP values, which are ultimately stored in the variable l (l=mm_add_ps(l, k)). (In the operations (1004), there are several minor arithmetic differences compared to the code listing (910) in FIG. 9b. First, the exponent value e is calculated as e=e'−128 instead of e=e'−127, where the factor of −128 is shown as 0×80 in the operations (1004). The difference of −1 in the value of e (due to changing −127 to −128) is amplified by a factor of 6, creating a total difference of −6. Second, a factor of +1.5 f is added during the operations (1004), instead of a factor of −4.0 as shown in the code listing (910). The difference of +5.5 (due to changing −4 to +1.5) effectively compensates for the difference of −6, while also accounting for how rounding is performed for the code listing (910) in FIG. 9b versus the operations (1040) in FIG. 10.)

For the first group of four transform coefficients (the four "lower" transform coefficients), using operations (1005), the encoder verifies that the computed threshold QP values are within the range of the minimum QP value and maximum QP value, which were passed as inputs. As needed, the threshold QP value for a transform coefficient is clipped. (The threshold QP values for the first group of four transform coefficients are subsequently stored in the variable m (with the operation m=_mm_cvtps_epi32(l), among the later operations (1006)), after other values are read from the variable m.)

For a second group of four transform coefficients (the four "upper" transform coefficients), which were earlier buffered in the variable m (with the operation m=_mm_castps_si128 (l) among the earlier operations (1004)), the encoder continues. The encoder repeats most of the operations (1004, 1005) within later operations (1006, 1007). Thus, for the second group of four transform coefficients, the encoder computes threshold QP values and checks/ensures that the computed threshold QP values are within the bounds of the minimum QP value and maximum QP value. Finally, using another operation (1008), the QP values for the second group of four transform coefficients are stored in the variable e (with the operation e=_mm_cvtps_epi32(l)).

4. Implementation of Mappings and Lookup Functions

A bits-rho mapping or QP-rho mapping can be implemented in various ways. For example, a QP-rho mapping can be implemented as a lookup table such as an array, in which entries including rho values are indexed by QP values. A bits-rho mapping can similarly be implemented as a lookup table such as an array, in which entries including rho values are indexed by bit allocation values.

Or, a bits-rho mapping can be implemented as a linear function including a term in the form of $\theta \times (1-\rho)$ (where rho values indicate proportion of zero-value coefficients), which captures a linear relation between bit allocation and rho value. The bits-rho mapping can also include a constant term, which captures a fixed number of bits used during encoding regardless of rho value or QP. To set a rho value based on a target bit allocation using a bits-rho mapping, the encoder can calculate the rho value by applying the target bit allocation to a linear function, and solving for the rho value.

To set a QP value by looking up a target rho value in a QP-rho mapping, the encoder can find a rho value in the QP-rho mapping that is equal to the target rho value or, if no equal rho value is found, find the lowest rho value in the QP-rho mapping that is higher than the target rho value (where rho value indicates proportion of zero-value coefficients). For example, suppose the target rho value is 0.720 for a unit, and the QP-rho mapping includes corresponding rho values . . . , 0.702, 0.711, 0.719, 0.725, 0.730, . . . . The encoder finds the rho value 0.725 as the lowest rho value in the QP-rho mapping that is higher than the target rho value. The encoder then sets the QP value for the unit as the candidate QP value associated with the rho value 0.725. Alternatively, to set a QP value by looking up a target rho value in a QP-rho mapping, the encoder finds the rho value in the QP-rho mapping that is closest to the target rho value, whether the closest rho value is less than, equal to, or greater than the target rho value. In the preceding numerical example, the encoder finds the rho value 0.719 as the closest rho value in the QP-rho mapping and sets the QP value for the unit as the candidate QP value associated with the rho value 0.719. If a bits-rho mapping is implemented as a lookup table, an encoder can similarly find the bit allocation in the bits-rho mapping that is closest to the target bit allocation, and return the corresponding rho value, or it can interpolate between the two closest bit allocations (and corresponding rho values) in the bits-rho mapping.

A bits-rho mapping is a mapping between bit allocation values and corresponding rho values. A bits-rho mapping can be a mapping from bit allocation values to rho values, or it can be a mapping from rho values to bit allocation values. Similarly, a QP-rho mapping is a mapping between QP values and corresponding rho values. A QP-rho mapping can be a mapping from QP values to rho values, or it can be a mapping from rho values to QP values.

5. Rho Value Indicating Proportion of Non-Zero-Value Coefficients

In many of the preceding examples, a rho value indicates a target proportion of zero-value quantized transform coefficients for a current unit such as a picture of video. Alternatively, a rho value indicates a target proportion of non-zero-value quantized transform coefficients for the current unit. For example, if the proportion of zero-value coefficients is 0.723, the rho value can be 0.723 (for zero-value coefficients) or 0.277 (for non-zero-value coefficients). Either way, the rho value is useful as a control value because a linear relationship between rho values and real bit rates has been observed in many encoding scenarios, for many types of video content. As such, even when rho value indicates a target proportion of non-zero-value quantized transform coefficients, rho value is strongly indicative of final bit rate.

If rho value indicates a proportion of non-zero-value quantized transform coefficients, the linear relationship between rate and rho value can be simplified as $R(\rho)=\theta \times (\rho)$, where $\theta$ is the slope of the linear relationship. For the mapping (500) of bit allocations to corresponding rho values shown in FIG. 5, for example, if rho values instead indicate proportion of non-zero-value quantized transform coefficients, the rho values increase in a linear manner as bit allocation increases. The slope values 8 are positive rather than negative (e.g., slope of 1.5 if rho value indicates target proportion of non-zero value coefficients, and slope of $-1.5$ if rho value indicates target proportion of zero-value coefficients).

Similarly, when determining a QP-rho mapping, instead of determining a count of zero-value transform coefficients when a given value of QP is used for quantization, the encoder can determine a count of non-zero-value transform coefficients when the given value of QP is used for quantization. The encoder can estimate the count of non-zero-value transform coefficients or actually calculate the count of non-zero-value transform coefficients. The count of non-zero-value transform coefficients for a given unit generally decreases or stays the same as QP increases. For the values in the histogram (600) of FIG. 6, for example, for each of the different candidate values of QP, the count of non-zero-value transform coefficients would be the total count of coefficients minus the count of zero-value transform coefficients shown in the histogram (600). The encoder can set the corresponding rho values for the candidate values of QP based on the counts of non-zero-value transform coefficients, which may be stored in a histogram or other data structure. For example, for QP=1 to QP=51, a corresponding rho value is set based on the proportion of non-zero-value transform coefficients when that value of QP is used. When rho values indicate proportions of non-zero-value quantized transform coefficients, the rho values decrease as QP increases.

C. Techniques for Rho-domain Rate Control with Reduced Computational Complexity This section describes several techniques for rho-domain rate control.

1. First Variation of Rho-domain Rate Control

Figure 11:
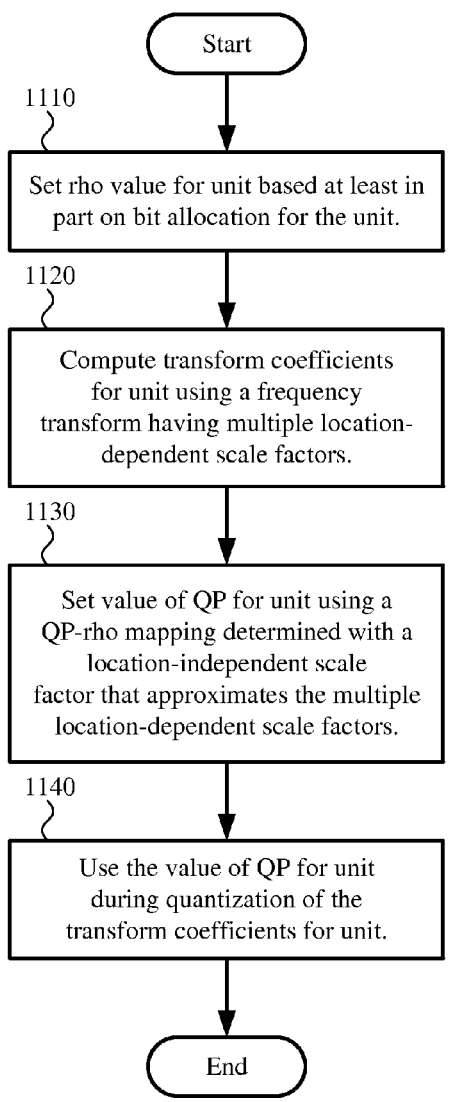
FIGS. 11 and 12 are flowcharts illustrating generalized techniques for two variations of rho-domain rate control.

FIG. 11 shows a generalized technique (1100) for a first variation of rho-domain rate control. An encoder such as the encoder (400) described with reference to FIG. 4 or another encoder performs the technique (1100). The encoder can be a video encoder, image encoder, or audio encoder. Overall, the encoder encodes a current unit of media to produce encoded data and outputs the encoded data. For example, for video, the current unit of media is group of pictures, a picture, a group of macroblocks, a macroblock, a coding unit, or a block. As part of the encoding, the encoder performs rate control as shown in FIG. 11.

To start, the encoder sets (1110) a rho value for the current unit based at least in part on a bit allocation for the current unit. The rho value indicates, for example, a target proportion of zero-value quantized transform coefficients for the current unit. For example, the rho value is a rho value as explained in section V.A or V.B. (Or, alternatively, the rho value indicates a target proportion of non-zero-value quantized transform coefficients for the current unit, as explained in section V.B.5.) The rho value for the current unit can be set (1110) before or after a QP-rho mapping is determined for the current unit.

The bit allocation can be set for the current unit individually, or the bit allocation can be set for a larger area that includes the current unit, in which case the bit allocation for the larger area is prorated. The bit allocation can depend on: (a) complexity of the current unit or the larger area, (b) content classification of the current unit or the larger area, (c) coding type of the current unit or the larger area, (d) available bit rate, and/or (e) buffer fullness of a coded data buffer of the encoder. Alternatively, the bit allocation depends on other and/or additional factors.

The encoder can set the rho value for the current unit using a bits-rho mapping, which is a mapping between candidate values of bit allocation and corresponding rho values for the candidate values of bit allocation, respectively. The bits-rho mapping can provide rho values for a range of bit allocation values, from a minimum bit allocation value to a maximum bit allocation value, within which there is a linear relation between bit allocation values and rho values. For example, the bits-rho mapping is a bits-rho mapping as described in section V.A, V.B.4 and/or V.B.5, which has a linear relation between bit allocation values and rho values. The bits-rho mapping incorporates a slope value that depends on a number of bits per non-zero value coefficient. The slope value can have an initial value but be updated during encoding. For example, the slope value starts at a default, initial value, but is updated during encoding based at least in part on bit rate results and counts of non-zero quantized transform coefficients for one or more previous units of the media. Alternatively, the slope value is updated in some other way.

Returning to FIG. 11, the encoder computes (1120) transform coefficients for the current unit using a frequency transform having multiple location-dependent scale factors. The encoder sets (1130) a value of QP for the current unit using a QP-rho mapping, which is a mapping between candidate values of QP and corresponding rho values for the candidate values of QP, respectively. The QP-rho mapping is determined with a location-independent scale factor that approximates the multiple location-dependent scale factors. For example, the location-independent scale factor is the average of the multiple location-dependent scale factors, a weighted average of the multiple location-dependent scale factors, the median of the multiple location-dependent scale factors, or some other representative value that approximates the multiple location-dependent scale factors.

The QP-rho mapping includes, for each of the candidate values of QP, a rho value if that candidate value of QP is used during quantization. For example, the QP-rho mapping is a QP-rho mapping as described in section V.B. The QP-rho mapping can provide rho values for a range of QP values, from a minimum QP value to a maximum QP value. The range of QP values can include all possible QP values as candidate QP values, or it can include some subset of the possible QP values as candidate QP values. To determine the QP-rho mapping, the encoder can perform the process described below with reference to stage (1230) of FIG. 12. Alternatively, the encoder determines the QP-rho mapping in some other way. The QP-rho mapping for the current unit can be determined during encoding for the current unit. Or, the QP-rho mapping for the current unit can be determined before encoding as part of a pre-analysis stage.

Returning to FIG. 11, the encoder uses (1140) the value of QP for the unit during quantization of the transform coefficients for the unit.

2. Second Variation of Rho-domain Rate Control

Figure 12:
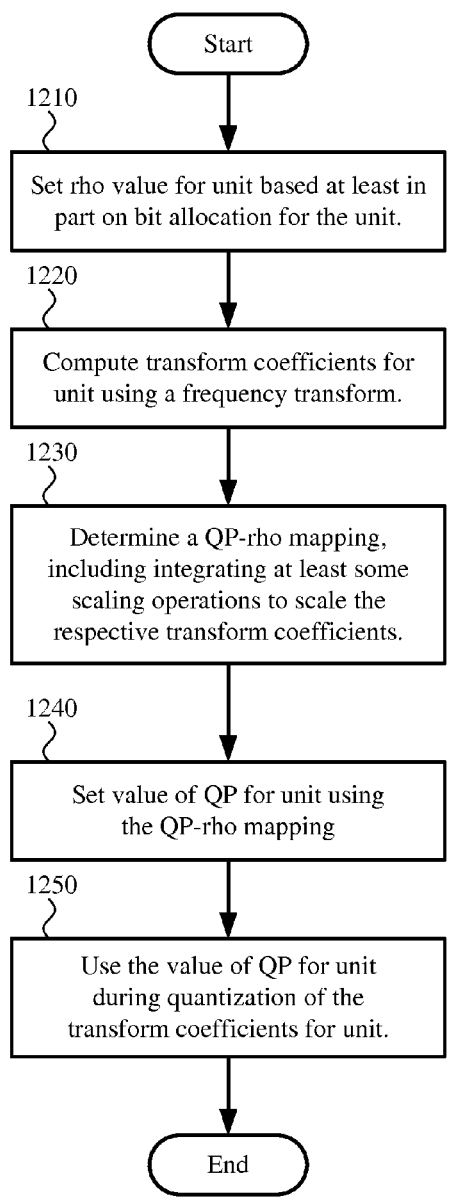

FIG. 12 shows a generalized technique (1200) for a second variation of rho-domain rate control. An encoder such as the encoder (400) described with reference to FIG. 4 or another encoder performs the technique (1200). The encoder can be a video encoder, image encoder, or audio encoder. Overall, the encoder encodes a current unit of media to produce encoded data and outputs the encoded data. For example, for video, the current unit of media is group of pictures, a picture, a group of macroblocks, a macroblock, a coding unit, or a block. The encoder performs rate control as shown in FIG. 12.

To start, the encoder sets (1210) a rho value for the current unit based at least in part on a bit allocation for the current unit. The rho value indicates, for example, a target proportion of zero-value quantized transform coefficients for the current unit. (Or, alternatively, the rho value indicates a target proportion of non-zero-value quantized transform coefficients for the current unit, as explained in section V.B.5.) Options for setting the bit allocation are described above with reference to stage (1110) of FIG. 11.

The encoder computes (1220) transform coefficients for the unit using a frequency transform. The frequency transform can have multiple location-dependent scale factors.

The encoder also determines (1230) a QP-rho mapping, which is a mapping between candidate values of QP and corresponding rho values for the candidate values of QP, respectively. The QP-rho mapping can provide rho values for a range of QP values, from a minimum QP value to a maximum QP value. The range of QP values can include all possible QP values as candidate QP values, or it can include some subset of the possible QP values as candidate QP values. The QP-rho mapping for the current unit can be determined (1230) during encoding. Or, the QP-rho mapping for the current unit can be determined (1230) before encoding as part of a pre-analysis stage.

When it determines the QP-rho mapping, the encoder integrates at least some scaling operations to scale the respective transform coefficients for the unit. For example, to determine the QP-rho mapping, for each of the transform coefficients for the current unit, the encoder estimates a first value of QP (threshold value of QP) at which the transform coefficient is quantized to zero. In doing so, the encoder multiplies the transform coefficient by a scale factor that depends on the frequency transform. When the frequency transform has multiple location-dependent scale factors, the scale factor that depends on the frequency transform can be a location-independent scale factor that approximates the multiple location-dependent scale factors, or it can be one of the multiple location-dependent scale factors. Then, for each of the candidate values of QP, the encoder counts how many of the transform coefficients are estimated to be quantized to zero (or, alternatively, counts how many of the transform coefficients are estimated to be not quantized to zero—see section V.B.5) if that candidate value of QP is used during quantization. The counting process can use the results of the estimating stage for the respective transform coefficients for the current unit. For each of the candidate values of QP, the encoder sets a rho value for the candidate value of QP.

When it estimates the first value of QP (threshold value of QP) at which a transform coefficient is quantized to zero, the encoder can multiply the transform coefficient by a location-independent scale factor, and then adjust the product of the multiplying to QP scale. For example, the encoder estimates the first value of QP (threshold value of QP) in a manner mathematically equivalent, within a threshold level of precision, to $QP_{first}=6 \times \log_2(c \times m)+6$, where c is the transform coefficient, m is the location-independent scale factor, and $QP_{first}$ is the first value of QP at which the transform coefficient is quantized to zero. The threshold level of precision is satisfied in the approaches shown in FIG. 9b or FIG. 10, for example, or in another approach in which the value of $\log_2 (c \times m)$ is computed to an acceptable precision for the use case scenario.

Returning to FIG. 12, the encoder sets (1240) a value of QP for the current unit using the QP-rho mapping, and uses (1250) the value of QP for the unit during quantization of the transform coefficients for the current unit.

3. Third Variation of Rho-domain Rate Control

FIGS. 13a and 13b illustrate an example technique (1300) for a combined implementation for a variation of rho-domain rate control. The combined implementation uses a location-independent scale factor and integrates scaling operations when determining a QP-rho mapping. An encoder such as the encoder (400) described with reference to FIG. 4 or another encoder performs the technique (1300). The encoder can be a video encoder, image encoder, or audio encoder. Overall, the encoder successively encodes units of media to produce encoded data and outputs the encoded data. For example, for video, each of the units of media is a group of pictures, a picture, a group of macroblocks, a macroblock, a coding unit, or a block. The encoder performs rate control as shown in FIGS. 13a and 13b.

With reference to FIG. 13a, the encoder sets (1310) a bit allocation for the next unit, which will be processed as the current unit. The encoder sets (1320) a rho value for the current unit based at least in part on the bit allocation for the current unit. The encoder computes (1330) transform coefficients for the current unit using a frequency transform having multiple location-dependent scale factors. The encoder also determines (1340) a QP-rho mapping.

Although FIG. 13a shows the stage (1340) during encoding, the stage (1340) can also be performed during pre-encoding processing.

FIG. 13b shows details (1301) of the stage (1340) in some implementations. The encoder gets (1341) the next transform coefficient for the current unit, multiplies (1342) the transform coefficient by the location-independent scale factor, and adjusts (1343) the result to QP scale, in order to estimate the first value of QP (threshold value of QP) at which the transform coefficient is quantized to zero. The encoder checks (1344) if the transform coefficient is the last transform coefficient for the current unit. If not, the encoder gets (1341) the next transform coefficient for the current unit and estimates the first value of QP (threshold value of QP) at which that transform coefficient is quantized to zero.

After it has processed all transform coefficients of the current unit in this way, the encoder gets (1345) the next candidate value of QP, counts (1346) transform coefficients estimated to be quantized to zero if the candidate value of QP is used (or, alternatively, counts transform coefficients estimated to be not quantized to zero if the candidate value of QP is used; see section V.B.5), and sets (1347) a rho value for the candidate value of QP. The encoder checks (1348) if there is another candidate value of QP to process. If so, the encoder gets (1345) the next candidate value of QP to set the rho value for it. After the encoder sets rho values for all of the candidate QP values, the encoder finishes the stage (1341).

Returning to FIG. 13a, the encoder sets (1350) a value of QP for the current unit using the QP-rho mapping. The encoder then uses (1360) the value of QP for the current unit during quantization of the transform coefficients for the current unit. The encoder checks (1370) whether to continue with another unit. If so, the encoder sets (1310) the bit allocation for the next unit.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements an encoder, a method of rate control comprising:
   encoding a current unit to produce encoded data, including:
      setting a rho value for the current unit based at least in part on a bit allocation for the current unit;
      computing transform coefficients for the current unit using a frequency transform having multiple location-dependent scale factors, wherein the multiple location-dependent scale factors depend on coefficient position (i, j) for the transform coefficients, respectively, and wherein location is a coefficient position (i, j) for a transform coefficient within a block of the current unit;
      setting a value of quantization parameter ("QP") for the current unit using a QP-rho mapping between candidate values of QP and corresponding rho values for the candidate values of QP, respectively, the corresponding rho values of the QP-rho mapping having been determined using a single location-independent scale factor that approximates the multiple location-dependent scale factors that were used when computing the transform coefficients; and
      using the value of QP for the current unit during quantization of the transform coefficients for the current unit; and
   outputting the encoded data.

2. The method of claim 1, wherein the current unit is a group of pictures, a picture, a group of macroblocks, a macroblock, a coding unit, or a block.

3. The method of claim 1, wherein the bit allocation is (a) set for the current unit individually or (b) set for a larger area that includes the current unit and prorated for the current unit, and wherein the bit allocation depends on one or more of: (a) complexity of the current unit or the larger area, (b) content classification of the current unit or the larger area, (c) coding type of the current unit or the larger area, (d) available bit rate, and (e) buffer fullness of a coded data buffer of the encoder.

4. The method of claim 1, wherein the setting the rho value for the current unit uses a bits-rho mapping between candidate values of bit allocation and corresponding rho values for the candidate values of bit allocation, respectively, the bits-rho mapping incorporating a slope value that depends on a number of bits per non-zero value coefficient, the slope value being based at least in part on bit rate results and counts of non-zero quantized transform coefficients for one or more previous units.

5. The method of claim 1, wherein the location-independent scale factor is one of:
   average of the multiple location-dependent scale factors;
   a weighted average of the multiple location-dependent scale factors; and
   median of the multiple location-dependent scale factors.

6. The method of claim 1, wherein the QP-rho mapping includes, for each of the candidate values of QP, a rho value if the candidate value of QP is used during quantization.

7. The method of claim 1, further comprising determining the QP-rho mapping, including, for each of the candidate values of QP:
   counting, for the candidate value of QP, (a) how many of the transform coefficients are estimated to be quantized to zero or (b) how many of the transform coefficients are estimated to be not quantized to zero; and
   setting a rho value for the candidate value of QP.

8. The method of claim 7, wherein the determining the QP-rho mapping further includes:
   for each of the transform coefficients for the current unit, estimating a first value of QP at which the transform coefficient is quantized to zero;
   wherein the counting uses results of the estimating for the respective transform coefficients for the current unit.

9. The method of claim 8, wherein the estimating the first value of QP at which the transform coefficient is quantized to zero includes:
   multiplying the transform coefficient by the location-independent scale factor; and
   adjusting a product of the multiplying to QP scale.

10. The method of claim 8, wherein the estimating the first value of QP at which the transform coefficient is quantized to zero is performed in a manner mathematically equivalent, within a threshold level of precision, to the following equation:

$$QP_{first}=6\times\log_2(c\times m)+6,$$

where c is the transform coefficient, m is the location-independent scale factor, and $QP_{first}$ is the first value of QP at which the transform coefficient is quantized to zero.

11. The method of claim 1, wherein the encoding further includes determining the QP-rho mapping using an application-specific integrated circuit, a graphics processing unit, or single-instruction multiple-data instructions executing on a central processing unit.

12. A computer system comprising a processor, memory, and storage, wherein the computer system is configured to implement an encoder comprising:
   a frequency transformer configured to compute transform coefficients for a current unit using a frequency transform having multiple location-dependent scale factors, wherein the multiple location-dependent scale factors depend on coefficient position (i, j) for the transform coefficients, respectively, and wherein location is a coefficient position (i, j) for a transform coefficient within a block of the current unit;
   a quantizer configured to quantize the transform coefficients for the current unit using a value of quantization parameter ("QP") for the current unit; and a rate controller configured to:
  set a rho value for the current unit based at least in part on a bit allocation for the current unit; and
  set the value of QP for the current unit using a QP-rho mapping between candidate values of QP and corresponding rho values for the candidate values of QP, respectively, the corresponding rho values of the QP-rho mapping having been determined using a single location-independent scale factor that approximates the multiple location-dependent scale factors that were used when computing the transform coefficients.

13. The computer system of claim 12, wherein the location-independent scale factor is one of:
  average of the multiple location-dependent scale factors;
  a weighted average of the multiple location-dependent scale factors; and
  median of the multiple location-dependent scale factors.

14. The computer system of claim 12, wherein the QP-rho mapping includes, for each of the candidate values of QP, a rho value if the candidate value of QP is used during quantization.

15. The computer system of claim 12, wherein the rate controller is further configured to determine the QP-rho mapping, including, for each of the candidate values of QP:
  counting, for the candidate value of QP, (a) how many of the transform coefficients are estimated to be quantized to zero or (b) how many of the transform coefficients are estimated to be not quantized to zero; and
  setting a rho value for the candidate value of QP.

16. The computer system of claim 15, wherein the rate controller is further configured to perform, when determining the QP-rho mapping:
  for each of the transform coefficients for the current unit, estimating a first value of QP at which the transform coefficient is quantized to zero;
  wherein the counting uses results of the estimating for the respective transform coefficients for the current unit.

17. The computer system of claim 15, wherein the rate controller is configured to determine the QP-rho mapping using an application-specific integrated circuit, a graphics processing unit, or single-instruction multiple-data instructions executing on a central processing unit.

18. A computer-readable memory or storage device having encoded thereon computer-executable instructions for causing a computer system, when programmed thereby, to perform rate control comprising:
  setting a rho value for a current unit based at least in part on a bit allocation for the current unit;
  computing transform coefficients for the current unit using a frequency transform having multiple location-dependent scale factors, wherein the multiple location-dependent scale factors depend on coefficient position (i, j) for the transform coefficients, respectively, and wherein location is a coefficient position (i, j) for a transform coefficient within a block of the current unit;
  determining a quantization parameter ("QP")-rho mapping between candidate values of QP and corresponding rho values for the candidate values of QP, respectively, including using a single location-independent scale factor that approximates the multiple location-dependent scale factors, that were used when computing the transform coefficients, to scale the respective transform coefficients for the current unit when determining the QP-rho mapping;
  setting a value of QP for the current unit using the QP-rho mapping; and
  using the value of QP for the current unit during quantization of the transform coefficients for the current unit.

19. The computer-readable memory or storage device of claim 18, wherein the determining the QP-rho mapping includes:
  for each of the transform coefficients for the current unit, estimating a first value of QP at which the transform coefficient is quantized to zero, including multiplying the transform coefficient by the location-independent scale factor; and
  for each of the candidate values of QP:
    counting, for the candidate value of QP, (a) how many of the transform coefficients are estimated to be quantized to zero or (b) how many of the transform coefficients are estimated to be not quantized to zero, wherein the counting uses results of the estimating for the respective transform coefficients for the current unit; and
    setting a rho value for the candidate value of QP.

20. The computer-readable memory or storage device of claim 18, wherein the location-independent scale factor is one of:
  average of the multiple location-dependent scale factors;
  a weighted average of the multiple location-dependent scale factors; and
  median of the multiple location-dependent scale factors.

* * * * *